(12) United States Patent
Weixler et al.

(10) Patent No.: US 11,980,957 B2
(45) Date of Patent: May 14, 2024

(54) APPARATUS FOR A CHAMFER MACHINING OF A WORKPIECE

(71) Applicant: Liebherr-Verzahntechnik GmbH, Kempten (DE)

(72) Inventors: Johannes Weixler, Durach (DE); Robert Würfel, Kempten (DE); Alexander Hunt, Kempten (DE); Johannes van Hauth, Kempten (DE)

(73) Assignee: LIEBHERR-VERZAHNTECHNIK GMBH, Kempten (DE)

( * ) Notice: Subject to any disclaimer, the term of this patent is extended or adjusted under 35 U.S.C. 154(b) by 0 days.

(21) Appl. No.: 16/380,617

(22) Filed: Apr. 10, 2019

(65) Prior Publication Data

US 2019/0314911 A1  Oct. 17, 2019

(30) Foreign Application Priority Data

Apr. 11, 2018  (DE) ...................... 10 2018 108 632.6

(51) Int. Cl.
*B23F 19/10* (2006.01)
(52) U.S. Cl.
CPC .................................. *B23F 19/105* (2013.01)
(58) Field of Classification Search
CPC ...... B23F 19/105; B23F 19/102; B23F 19/10; B23C 2220/16; B23C 2265/08; Y10T 409/101113; Y10T 409/101272
See application file for complete search history.

(56) References Cited

U.S. PATENT DOCUMENTS

| | | | | |
|---|---|---|---|---|
| 1,219,481 | A | * | 3/1917 | Patterson et al. ....... B23F 19/10 409/8 |
| 3,724,042 | A | * | 4/1973 | Raess .................... B23F 19/025 29/90.6 |

(Continued)

FOREIGN PATENT DOCUMENTS

| | | | |
|---|---|---|---|
| CN | 105665839 | A * | 6/2016 |
| CN | 105834528 | A * | 8/2016 |

(Continued)

OTHER PUBLICATIONS

Description JPS6234721A (translation) obtained at https://worldwide.espacenet.com/ (last visited Oct. 28, 2021).*

(Continued)

*Primary Examiner* — Ryan Rufo
(74) *Attorney, Agent, or Firm* — McCoy Russell LLP

(57) ABSTRACT

The present invention shows an apparatus for a chamfer machining of a toothed workpiece comprising a workpiece spindle having a workpiece holder rotatably supported about an axis of rotation for holding the workpiece, a tool spindle having a tool holder rotatably supported about an axis of rotation for holding a finger mill, wherein the tool spindle is travelable relative to the workpiece holder via at least one linear axis of the apparatus, and a control having a machining function that rotates the workpiece held in the workpiece holder by controlling the workpiece spindle for the chamfer machining of a toothed workpiece while a finger mill held in the tool holder engages at the edge to be machined. It is characterized in that the machining function varies the rotational speed of the workpiece during the chamfer machining.

16 Claims, 12 Drawing Sheets

(56) References Cited

U.S. PATENT DOCUMENTS

Figure 1A:
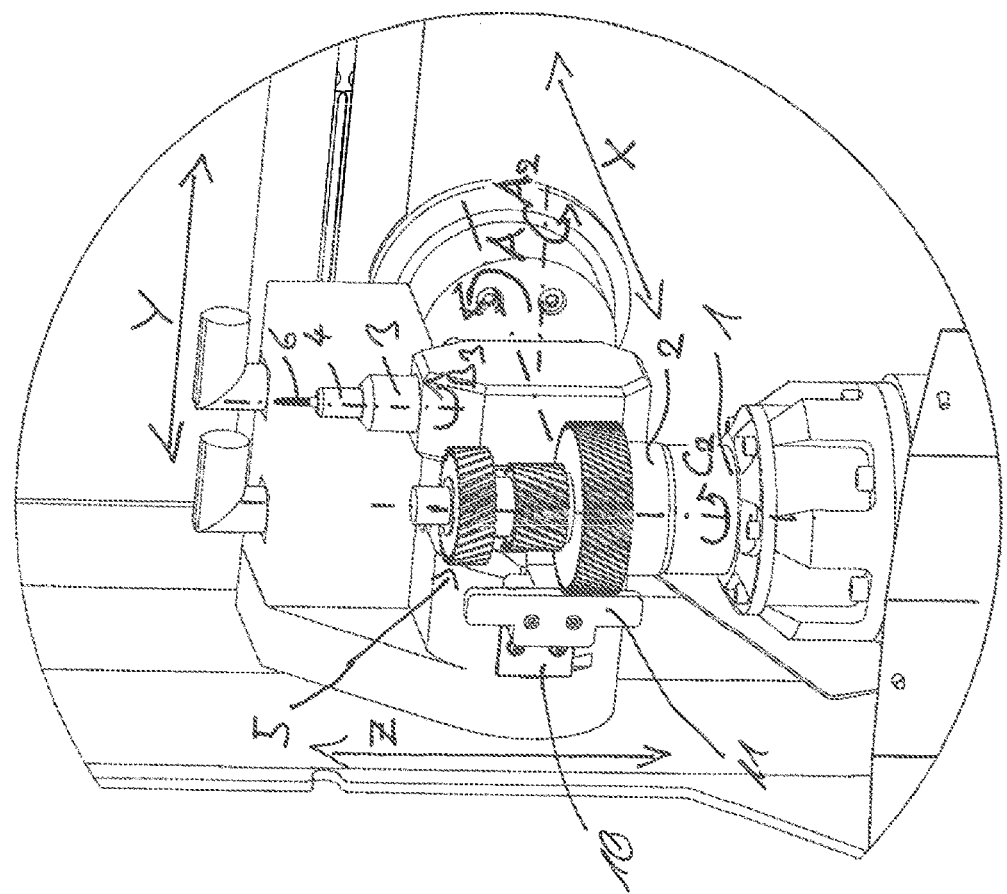

| | | | | |
|---|---|---|---|---|
| 4,012,990 | A | * | 3/1977 | Wagner ................ B23F 19/105 451/147 |
| 7,377,731 | B1 | * | 5/2008 | Arvin ..................... B23F 19/12 409/11 |
| 10,583,507 | B2 | * | 3/2020 | Weppelmann ........ B23F 19/102 |
| 2012/0155980 | A1 | * | 6/2012 | Ronald ................ B23F 17/006 409/8 |
| 2014/0294530 | A1 | * | 10/2014 | Geiser ................. B23F 23/006 409/8 |
| 2016/0089737 | A1 | * | 3/2016 | Zeller .................. B23F 19/102 409/8 |
| 2017/0087653 | A1 | * | 3/2017 | Winkel ................. B23F 19/10 |
| 2017/0173713 | A1 | * | 6/2017 | Thijssen ................ B23F 5/163 |
| 2018/0079019 | A1 | * | 3/2018 | Heyn .................... B23F 19/107 |
| 2018/0236576 | A1 | * | 8/2018 | Tachikawa ............. B23F 1/065 |

FOREIGN PATENT DOCUMENTS

| | | | | |
|---|---|---|---|---|
| DE | 3000295 | A1 * | 7/1981 | ......... B23F 23/1237 |
| DE | 4134925 | C1 * | 11/1992 | ......... B23F 23/1237 |
| DE | 4134925 | C1 | 11/1992 | |
| DE | 19701267 | A1 | 7/1998 | |
| DE | 202007016740 | U1 * | 4/2008 | ............... B23C 1/12 |
| DE | 202009015537 | U1 * | 3/2010 | ............... B23C 3/12 |
| DE | 102009020771 | A1 * | 11/2010 | ............. B25J 9/0096 |
| DE | 102009020771 | A1 | 11/2010 | |
| DE | 102011050498 | A1 | 11/2012 | |
| DE | 202012008601 | U1 | 1/2013 | |
| DE | 202013009805 | U1 * | 2/2014 | ............. B23F 19/10 |
| DE | 102013003804 | A1 * | 9/2014 | ............. B23F 19/12 |
| DE | 102013003804 | A1 | 9/2014 | |
| DE | 102013015240 | A1 | 10/2014 | |
| DE | 102014014132 | A1 | 5/2016 | |
| EP | 2700466 | A2 | 2/2014 | |
| EP | 3012056 | A1 | 4/2016 | |
| JP | S61152320 | A | 7/1986 | |
| JP | S6234721 | A | 2/1987 | |
| KR | 870002069 | B1 * | 12/1987 | |
| SU | 952483 | A1 * | 8/1982 | |
| SU | 1395434 | A1 * | 5/1988 | ........... B23F 19/105 |
| SU | 1634404 | A1 | 3/1991 | |
| SU | 1634404 | A1 * | 3/1991 | ........... B23F 19/105 |

OTHER PUBLICATIONS

Description DE102009020771A1 (translation) obtained at https://worldwide.espacenet.com/ (last visited May 2, 2022).*
Japanese Patent Office, Office Action Issued in Application No. 2019-048256, Nov. 4, 2020, 5 pages.
Japanese Patent Office, Office Action Issued in Application No. 2019-048256, Aug. 24, 2021, 8 pages.

* cited by examiner

APPARATUS FOR A CHAMFER MACHINING OF A WORKPIECE

CROSS-REFERENCE TO RELATED APPLICATION

The present application claims priority to German Application No. 10 2018 108 632.6 entitled "APPARATUS FOR A CHAMFER MACHINING OF A WORKPIECE," filed Apr. 11, 2018. The entire contents of the above-listed application are hereby incorporated by reference for all purposes.

TECHNICAL FIELD

The present invention relates to an apparatus for a chamfer machining of a toothed workpiece comprising a workpiece spindle having a workpiece holder rotatably supported about an axis of rotation for holding the workpiece, a tool spindle having a tool holder rotatably supported about an axis of rotation for holding a finger mill, wherein the tool spindle is travelable relative to the workpiece holder via at least one linear axis of the apparatus, and a control having a machining function that rotates the workpiece held in the workpiece holder by controlling the workpiece spindle for the chamfer machining of a toothed workpiece while a finger miller held in the tool holder engages at the edge to be machined.

BACKGROUND AND SUMMARY

Such an apparatus is known from DE 20 2012 008 601 U1. The finger mill used there has a frustoconical tool head and is traveled to the respective edge of the toothed workpiece from above or from below to chamfer mill it. The tool spindle is for this purpose moved over the at least one movement axis of the apparatus such that the finger mill held in the tool holder is guided in a controlled manner along the contour of the edge of the workpiece to be machined while the workpiece is rotated about its axis of rotation. The apparatus for chamfer machining is arranged at the counter column of a machine tool on which the gearing is manufactured and hereby permits a chamfer machining of the workpiece in the same fixture in which the gearing were also produced. The apparatus for chamfer machining known from DE 20 2012 008 601 U1 can, however, only be used with easily accessible edges of gearing. The speed at which the chamfer machining can be carried out is furthermore limited and the finger mill is exposed to high wear.

DE 10 2009 020 771 A1 likewise describes the chamfering of a workpiece via a finger mill. A 6-axis industrial robot is, however, used here to travel the tool spindle.

An apparatus for chamfer machining is furthermore known under the name "Gratomat" in which a finger mill having a cylindrical jacket surface is used that lies on the tooth edge under a preload and therefore follows the contour of the edge on a rotational movement of the workpiece. The tool spindle is pivotably supported for this purpose and is preloaded toward the edge via a spring. In the Gratomat process, however, great fluctuations of the chamfer size and of the chamfer shape result from the addendum to the dedendum. The speed of the process is furthermore low and the finger mill is exposed to high wear.

It is therefore the object of the present invention to provide an improved apparatus for chamfer machining.

This object is achieved by an apparatus for a chamfer machining of a toothed workpiece comprising a workpiece spindle having a workpiece holder rotatably supported about an axis of rotation for holding the workpiece; a tool spindle having a tool holder rotatably supported about an axis of rotation for holding a finger mill, wherein the tool spindle is travelable via at least one linear axis of the apparatus relative to the workpiece holder; and a control having a machining function that rotates the workpiece held in the workpiece holder by controlling the workpiece spindle for the chamfer machining of a toothed workpiece while the finger mill held in the tool holder engages at the edge to be machined, wherein the machining function varies the rotational speed of the workpiece during the chamfer machining. Preferred embodiments of the present invention form the subject of the dependent claims.

In a first aspect, the present invention comprises an apparatus for a chamfer machining of a toothed workpiece comprising a workpiece spindle having a workpiece holder rotatably supported about an axis of rotation for holding the workpiece, a tool spindle having a tool holder rotatably supported about an axis of rotation for holding a finger mill, wherein the tool spindle is travelable relative to the workpiece holder via at least one linear axis of the apparatus, and a control having a machining function that rotates the workpiece held in the workpiece holder by controlling the workpiece spindle for the chamfer machining of a toothed workpiece while a finger miller held in the tool holder engages at the edge to be machined. Provision is made in accordance with the invention that the machining function varies the rotational speed of the workpiece during the chamfer machining.

While work was carried out at a constant speed of the workpiece in accordance with the prior art, said speed varies in accordance with the first aspect of the present invention while the finger mill machines the edge. The inventors of the present invention have recognized that the relative speed between the edge and the finger mill either fluctuates greatly, which has a negative influence on the machining speed, on the machining result, and on the service life of the finger mill, or the contour cannot be machined at all due to the contour of the edge at a constant speed. These problems can be avoided by the variation of the speed or of the rotational speed.

Provision is preferably made that the machining function varies the rotational speed over a tooth space, i.e. the machining of different regions of a tooth space takes place at different rotational speeds of the workpiece.

A tooth space is preferably understood as a region that is formed by two oppositely disposed tooth traces, by the dedendum disposed therebetween, and the respective half of the adjacent addenda. The active regions of the gearing configured for rolling of on other gearing are understood as tooth traces. With involute gearing, the tooth traces correspond to the involute regions of the gearing.

The rotational speed of the workpiece preferably fluctuates over the tooth space by more than 30% of the maximum value, further preferably by more than 60% of the maximum value.

In a possible embodiment of the present invention, the machining function uses the same speed profile of the rotational speed for every tooth space. The variation in the speed therefore repeats for every tooth space of the tooth edge to be machined.

In a possible embodiment of the present invention, the machining function varies the rotational speed over a tooth space such that the cutting volume of the finger mill per unit of time and/or the relative speed between the edge and the finger mill over the tooth space varies/vary by no more than 30% of the maximum value, preferably by no more than 15% of the maximum value.

In a possible embodiment of the present invention, the machining function varies the rotational speed of the workpiece over at least one tooth trace, i.e. work is carried out at different rotational speeds in different regions of a tooth trace.

In a possible embodiment of the present invention, the machining function varies the rotational speed of the workpiece over a tooth space such that a left tooth trace is machined at a different rotational speed and/or rotational acceleration than a right tooth trace. The average, minimal and/or maximum rotational speed and/or rotational acceleration can in particular be greater for one tooth trace than for the other tooth trace.

The rotational speeds of the workpiece on the left and right traces preferably differ by more than 10% of the greater value, further preferably by more than 30% of the greater value.

In a possible embodiment of the present invention, the machining function varies the rotational speed over a tooth space such that a left tooth trace is machined with a rotational speed profile that is not symmetrical with the rotational speed profile used on the right tooth trace. This in particular takes the special demands on the chamfering of helical gearing arrangements into account. Such a rotational speed profile differing for the left and right traces can, however, also be used with straight gearing arrangements. The gear teeth themselves can be configured as symmetrical or asymmetrical on the left and right traces.

In a possible embodiment of the present invention, the machining function varies the rotational speed over a tooth space such that work is carried out at a greater rotational acceleration of the workpiece in the region of the dedendum than at at least one tooth trace and preferably at both tooth traces. The average, minimal and/or maximum rotational acceleration can in particular be greater in the region of the dedendum than at at least one tooth trace and preferably at both tooth traces. The region of the dedendum can in particular be used to accelerate from a first rotational speed that is used in the chamfer machining of the end of the one trace at the dedendum side to another rotational speed that is used on the chamfer machining of the end of the other trace at the dedendum side.

In a possible embodiment of the present invention, the machining function varies the rotational speed over a tooth space such that work is carried out at a greater rotational speed and/or rotational acceleration of the workpiece in the region of the addendum than at at least one tooth trace and preferably at both tooth traces and/or in the region of the dedendum. The average, minimal and/or maximum rotational speed and/or rotational acceleration can in particular be greater in the region of the addendum than at at least one tooth trace and preferably at both tooth traces and/or in the region of the dedendum.

The rotational acceleration in the sense of the present invention can also be a negative acceleration, with the above indications preferably relating to the respective absolute value of the acceleration.

In accordance with the invention, the machining function can comprise one or more machining modes that implement one or more of the above-named possibilities of the variation singly or in combination.

In a large number of applications of the present invention, work is carried out with the same direction of rotation of the workpiece over the total tooth space and thus over the total tooth edge. The rotational speed will furthermore not drop to zero in a number of cases.

In a possible embodiment of the present invention, the machining function therefore comprises a machining mode in which work is carried out with the same direction of rotation of the workpiece over the total tooth space and thus over the total tooth edge and/or the rotational speed does not drop to zero.

In some applications of the present invention, the machining function in contrast changes the direction of rotation of the workpiece on traveling through a tooth space. The inventors of the present invention have recognized that this is necessary for the machining of some geometries.

In a possible embodiment of the present invention, the machining function therefore comprises a machining mode in which the direction of rotation of the workpiece changes on traveling through a tooth space.

The machining function can furthermore have a machining mode in which the rotational speed drops to zero on traveling through a tooth space.

This can take place in the course of the change in the direction of rotation in a possible embodiment.

The rotational speed remains at zero for a certain time period in a possible embodiment. This can also be of advantage without a subsequent change of the direction of rotation of the workpiece to enable a relative movement of the finger mill to the workpiece with a stationary workpiece.

In accordance with the invention, the machining function can comprise one or more of the above-named machining modes. If a plurality of machining modes are provided, the machining function preferably has a selection function, in particular as an element of the user guide.

In a possible embodiment of the present invention, the tool spindle is travelable over at least one movement axis of the apparatus relative to the workpiece holder, in particular over at least one linear axis and preferably over a plurality of linear axes.

The first aspect of the present invention can be used in a first variant in an apparatus in which the finger mill lies on the tooth edge under a preload and therefore follows the contour of the edge on a rotational movement of the workpiece, in particular without a movement of the tool spindle relative to the workpiece spindle controlled by drives of the apparatus. The tool spindle is for this purpose preferably pivotably supported and is preloaded via a spring toward the edge, in particular such as is known from the Gratomat process. A substantial advantage also results here by the variation of the rotational speed of the workpiece. The one or more linear axes can be used for an initial travel of the finger mill to the gearing.

In a preferred second variant of the first aspect, the tool spindle is in contrast travelable relative to the workpiece holder via at least one movement axis of the apparatus, wherein the machining function for the chamfer machining of a toothed workpiece held in the workpiece holder moves the tool spindle relative to the workpiece spindle via the at least one movement axis such that a finger mill held in the tool holder is guided in a controlled manner along the contour of an edge of the workpiece to be machined while the workpiece is rotated about its axis of rotation. This controlled movement of the tool spindle preferably take place in synchronization with the workpiece rotation.

Control commands and/or a predetermined contour can in particular be stored in a memory of the control and a corresponding control of the movement axes of the apparatus takes place on their basis, in particular via a control of the workpiece spindle and of the at least one movement axis with which the tool spindle can be moved relative to the workpiece spindle such that the finger mill travels over the predetermined contour.

Substantially higher cutting speeds than with the Gratomat process can be achieved by the controlled guidance of the finger mill synchronized with the rotational movement of the workpiece.

The possibility likewise results by the variation of the speed of the workpiece with respect to the procedure known from DE 20 2012 008 601 U1 that already provides a controlled guidance of the finger mill of working at a more uniform cutting speed that is thus higher overall.

In addition, the loading on and the wear of the finger mill is reduced by the variation of the speed of the workpiece.

In a possible embodiment of the present invention, the tool spindle is travelable via a first linear axis X in a direction perpendicular to the axis of rotation of the workpiece holder and/or via a second linear axis Z in parallel with the axis of rotation of the workpiece holder.

In accordance with the first variant of the first aspect, these axes can be used for an initial positioning of the finger mill toward the edge, but can no longer be traveled during the machining of an edge.

Provision is, however, preferably made that the machining function controls the tool spindle via the first linear axis X and/or via the second linear axis Z such that a finger mill held in the tool holder is guided in a controlled manner along the contour of an edge of the workpiece to be machined while the workpiece is rotated about its axis of rotation.

In a possible embodiment of the present invention, the control takes place such that the finger mill is guided in a controlled manner along the contour over at least a partial region of the tooth space by a superposition of a movement of the first linear axis X and of the second linear axis Z.

Alternatively or additionally, the control can take place such that the finger mill is guided in a controlled manner along the contour on traveling through a tooth space by both a movement of the first linear axis X and of the second linear axis Z. The travel movements by the first linear axis X and by the second linear axis Z, however, do not have to take place in a small time.

The relative movement between the tool spindle and the workpiece spindle during the chamfer machining of an edge can exclusively take place via one or both of these axes. Alternatively, in addition to one or both of these axes, however, still other movement axes of the apparatus can also be used to guide the finger mill held in the tool holder in a controlled manner along the contour of the edge of the workpiece to be machined, in particular via one or more pivot axes.

In a possible embodiment of the present invention, the machining function is configured such that it controls the tool spindle via the first linear axis X and/or via the second axis Z such that different axial regions of the jacket surface of a finger mill held in the tool holder come into engagement with the edge of the workpiece to be machined. The wear is hereby distributed over the length of the finger mill. This preferably takes place by a travel movement by the second linear axis Z.

Different axial regions of the jacket surface of a finger mill held in the tool holder can in particular come into engagement with the edge of the workpiece to be machined during the machining of a tooth edge and in particular over a tooth space.

Alternatively, different axial regions of the jacket surface of the finger mill can come into engagement with the respective edge of the workpiece to be machined for the machining of different tooth edges of a workpiece and/or on the machining of a plurality of identical workpieces in consecutive steps using the same finger mill for machining the same tooth edges.

In a possible embodiment of the present invention, the machining function is configured such that the tool holder is guided in a controlled manner along the contour of the edge to be machined only via the second linear axis Z and not via the first linear axis X at least over partial regions of a tooth space and/or is guided in a controlled manner along the contour of the edge to be machined only via the first linear axis X and not via the second linear axis Z. The travel movement via the first linear axis X has the advantage that a machining is also still possible with interference contours disposed very closely to the edge. The travel movement via the second linear axis Z has the advantage that the wear can be distributed over the length of the finger mill.

The relative movement between the tool spindle and the workpiece spindle during the chamfer machining of an edge can take place at least over partial regions of a tooth space exclusively via the first linear axis X or via the second linear axis Z, i.e. no other axes of the machining head are traveled. Alternatively, in addition to one or both of these axes, however, still other movement axes of the apparatus can also be used to guide the finger mill held in the tool holder in a controlled manner along the contour of the edge of the workpiece to be machined, in particular via one or more pivot axes.

In a possible embodiment of the present invention, the machining function is configured for the use of a finger mill having a cylindrical jacket surface or a conical jacket surface having a cone angle of less than 20°, preferably of less than 10°.

The finger mill can have a rounded head in a possible embodiment. It can optionally be used to machine the dedendum. However, for reasons of uniform wear, work is preferably only carried out with the conical or cylindrical jacket surface.

Provision is made in a possible embodiment of the present invention that the machining function works at an orientation of the tool holder by which a finger mill held in the tool holder extends, starting from the tool holder, through the tooth space to the edge of the gearing it is machining. This permits the machining of the edge also on the presence of interference contours.

The above-named embodiments of the present invention are also of advantage and are subject matters of the present invention independently of a variation of the speed of the workpiece holder.

In accordance with a second independent aspect, the present invention therefore comprises an apparatus for the chamfer machining of a toothed workpiece comprising a workpiece spindle having a workpiece holder rotatably supported about an axis of rotation for holding the workpiece, a tool spindle having a tool holder rotatably supported about an axis of rotation for holding a finger mill, wherein the tool spindle is travelable via a first linear axis X in a direction perpendicular to the axis of rotation of the workpiece holder and/or via a second linear axis Z in parallel with the axis of rotation of the workpiece holder relative to the workpiece holder, and a control having a machining function that moves the tool spindle via the first linear axis X and/or via the second linear axis Z relative to the workpiece spindle for the chamfer machining of a toothed workpiece held in the workpiece holder such that a finger mill held in the tool holder is guided in a controlled manner along the contour of an edge of the workpiece to be machined while the workpiece is rotated about its axis of rotation.

In accordance with a first variant, the second aspect is characterized in that the machining function controls the tool spindle via the first linear axis X and/or via the second linear axis Z such that different axial regions of the jacket surface of a finger mill held in the tool holder come into engagement with the edge of the workpiece to be machined. The wear is hereby distributed over the axial length of the finger mill. This preferably takes place by a travel movement by the second linear axis Z.

Different axial regions of the jacket surface of a finger mill held in the tool holder can in particular come into engagement with the edge of the workpiece to be machined during the machining of a tooth edge and in particular over a tooth space.

Alternatively or additionally, different axial regions of the jacket surface of the finger mill can come into engagement with the respective edge of the workpiece to be machined for the machining of different tooth edges of a workpiece and/or on the machining of a plurality of identical workpieces in consecutive steps using the same finger mill for machining the same tooth edges.

The machining function is preferably configured in the first variant of the second aspect such that the position of the tool spindle relative to the workpiece holder is changed via the second linear axis Z for different axial regions of the jacket surface of a finger mill held in the tool holder to come into engagement with the edge of the workpiece to be machined.

This change of the position via the second linear axis Z can take place during the machining of a tooth edge and in particular over a tooth space and/or on the machining of different tooth edges of a workpiece and/or on the machining of the same tooth edge of a plurality of identical workpieces in consecutive steps.

In a possible further variant of the second aspect that is preferably combined with the first variant, the machining function is configured such that the tool holder is guided in a controlled manner along the contour of the edge to be machined at least over partial regions of a tooth space only via the second linear axis Z and not via the first linear axis X.

The relative movement between the tool spindle and the workpiece spindle during the chamfer machining of an edge can take place at least over partial regions of a tooth space exclusively via the second linear axis Z, i.e. no other axes of the machining head are traveled. Alternatively, in addition to the second linear axis Z, however, still other axes of movement of the apparatus can also be used to guide the finger mill held in the tool holder in a controlled manner along the contour of the edge of the workpiece to be machined, in particular via one or more pivot axes.

In accordance with a second variant of the second aspect, the machining function is configured for the use of a finger mill having a cylindrical jacket surface or a conical jacket surface having a cone angle of less than 20°, preferably of less than 10°. This permits the machining of edges that are difficult to access due to interference contours and/or the distribution of the wear over the axial length of the finger mill.

The finger mill can have a rounded head in a possible embodiment. It can optionally be used to machine the dedendum. However, for reasons of uniform wear, work is preferably only carried out with the conical or cylindrical jacket surface.

In accordance with a third variant of the second aspect, the machining function is configured such that work is carried out with an alignment of the tool holder by which a finger mill held in the tool holder extends, starting from the tool holder, through the tooth space to the edge of the gearing that it is machining. It can in particular be a machining mode of the machining function here. The machining of edges that are difficult to access due to interference contours is hereby possible. The machining function is preferably configured such that a only a tip of a finger mill held in the tool holder projects above that end face of the workpiece whose edge with the gearing is machined by the finger mill.

The individual variants of the second aspect can each be used individually and independently of one another and are subjects of the present invention independently of one another. At least two of the variants are, however, preferably combined with one another, further preferably three variants, further preferably all of the variants.

The first and second aspects of the present invention can furthermore be combined with one another.

In a possible embodiment of the present invention, the tool spindle is not pivoted on traveling through a tooth space. If a pivot axis is present via which the tool spindle is pivotable, this can, however, be used for an initial alignment of the finger mill relative to the workpiece.

In a possible embodiment of the present invention, the tool spindle is pivotable about a first pivot axis A or A2.

In a possible embodiment of the present invention that is also a subject matter of the present invention independently of the above-described aspects, the machining function is configured such that it pivots the tool spindle via the first pivot axis A or A2 on traveling through a tooth space to reduce variations of the angle of the chamfer over the tooth space measured in a plane perpendicularly intersecting the tooth trace.

Differently than in accordance with DE 20 2012 008 601 U1, the pivoting during the machining therefore does not take place to generate different chamfer angles over the tooth space, but in contrast to reduce variations in the chamfer angle that would arise on a travel movement only via the linear axes of the apparatus.

The first pivot axis A preferably extends perpendicular to the axis of rotation of the workpiece holder and/or in parallel with the first linear axis X.

Alternatively or additionally, the first pivot axis A2 can extend in a plane that is perpendicular to the first linear axis X.

In accordance with a third independent aspect, the present invention comprises an apparatus for the chamfer machining of a toothed workpiece comprising a workpiece spindle having a workpiece holder rotatably supported about an axis of rotation for holding the workpiece, a tool spindle having a tool holder rotatably supported about an axis of rotation for holding a finger mill, wherein the tool spindle is travelable via a first linear axis X in a direction perpendicular to the axis of rotation of the workpiece holder and via a second linear axis Z in parallel with the axis of rotation of the workpiece holder relative to the workpiece holder, and a control having a machining function that moves the tool spindle via the first linear axis X and/or via the second linear axis Z relative to the workpiece spindle for the chamfer machining of a toothed workpiece held in the workpiece holder such that a finger mill held in the tool holder is guided in a controlled manner along the contour of an edge of the workpiece to be machined while the workpiece is rotated about its axis of rotation. The third aspect is characterized in that the tool spindle is travelable via a third linear axis Y or V that extends in a plane that is perpendicular to the first linear axis X.

The third linear axis makes possible a simplified and/or more uniform chamfer machining, in particular of helical gearing arrangements.

The third linear axis can in particular be used to position the finger mill for the machining of an edge of the gearing in a zero position relative to the gearing, in which position the finger mill is arranged centrally in the tooth space, wherein the contact point between the finger mill and the edge to be machined is laterally displaced with respect to a plane that extends through the axis of rotation of the workpiece holder in parallel with the first linear axis X.

The travel movement of the finger mill for traveling over the contour of the edge then can, in a possible embodiment of the present invention, take place without a travel movement of the third linear axis Y or V. Alternatively, the third linear axis Y or V can, however, also be used during the chamfer machining of an edge for traveling over the contour of the edge.

The tool spindle for the chamfer machining via the third linear axis Y or V is preferably arranged such that the axis of rotation of the tool holder does not intersect the axis of rotation of the workpiece holder and preferably extends skewed thereto.

The third aspect of the present invention is a subject matter of the present invention independently of the other aspects. In possible embodiments of the present invention, it can be combined with the first and/or second aspects of the present invention.

Preferred embodiments that further develop each of the previously described aspects will be described in more detail in the following:

In a possible embodiment of the present invention, the machining function is configured such that no chamfer or a smaller chamfer is generated in the region of the dedendum than at the tooth trace. This in particular takes place by a corresponding control of the movement axes of the gear manufacturing machine via which the finger mill is moved in a controlled manner along the contour of the edge.

The circumstance can be taken into account by this procedure that a finger miller having a correspondingly small radius has to be used for generating a larger chamfer in the region of the dedendum since the dedendum typically has a much smaller radius.

By the dispensing with of a chamfer in the dedendum or a smaller chamfer in this region, finger mills can in contrast be used having a diameter that is greater than the diameter of the dedendum without effecting a collision of the finger mill with a tooth trace on the machining of the edge of the dedendum.

In a possible embodiment of the present invention, the tool spindle is pivotable via a second pivot axis A2 that is aligned perpendicular to its axis of rotation and extends in a plane that is perpendicular to the first linear axis X. The second pivot axis A2 can be provided in addition to or instead of the first pivot axis A.

The second pivot axis A2 permits the setting of the chamfer angle and/or the machining of upper and lower edges of the gearing.

In a possible embodiment of the present invention, the tool spindle is pivotable via the second pivot axis A2 from a first machining position for machining a lower edge of the workpiece into a second machining position for machining an upper edge.

In a possible embodiment of the present invention, the second pivot axis A2 permits a pivoting of the axis of rotation of the tool holder in a plane in which the first pivot axis A extends.

The second pivot axis A2 can be an adjusting axis. The machining positions can, for example, be defined in this case by abutments, in particular by adjustable abutments.

In an alternative embodiment, the second pivot axis A2 is an NC axis. The second pivot axis A2 can in this case also be used beyond the above-named functions during the chamfer machining to travel the finger mill in a controlled manner along the edge to be machined and in this process in particular can be used for influencing the chamfer angle.

In a possible embodiment of the present invention, the at least one movement axis and/or the first linear axis and/or the second linear axis Z and/or the third linear axis Y or V and/or the first pivot axis A are NC axes.

The apparatus comprises a meshing sensor in a possible embodiment of the present invention. This allows the position of the tooth spaces and/or addenda of the gearing to be determined and to carry out the correct association between the finger mill and the gearing from this. It can in particular be a contactlessly working meshing sensor, for example an inductive sensor.

In a possible embodiment of the present invention, the meshing sensor is arranged at a machining head that is movable via at least one movement axis and also carries the tool spindle. The at least one movement axis can therefore be used for positioning both the meshing sensor and the finger mill relative to the gearing.

In a possible embodiment of the present invention, the tool spindle is pivotably arranged at the machining head via a second pivot axis A2, said machining head carrying the meshing sensor so that the tool spindle is pivotable into a neutral position by the machining function while the gearing is measured by the meshing sensor.

In a possible embodiment, the machining function is configured such that a chamfer is only generated in partial regions of the second edge. Those regions of the edge in which sufficient material for generating a chamfer is not available can in particular hereby be left out in the chamfer machining.

The finger mill can therefore also be used in the gearing of shafts in which the dedendum substantially corresponds to the radius of the shaft and no tooth edge is therefore present in this region. Since the finger mill is guided in an NC controlled manner along the tooth edge while the workpiece is rotated, only the addenda and the tooth traces can here, for example, be chamfered while leaving out the dedendum.

In a possible embodiment, the control comprises a function for inputting a parameter of the desired chamfer shape and/or a function for determining the chamfer shape from one or more parameters of the space contour of the gearing that is to be chamfered.

The parameter of the chamfer shape can in particular be a chamfer width and/or a chamfer depth and/or a chamfer angle and/or a symmetry property.

The one or more parameters of the space contour of the gearing can in particular be one or more parameters that can be input via a function for dressing the gear cutting process with which the gearing is generated. A CAD model of the gearing and/or chamfer is hereby not necessary.

In a possible embodiment, the chamfer shape is determined using the input parameter of the chamfer shape and the one or more parameters of the space contour.

In a possible embodiment, the control comprises an input function via which a desired chamfer shape can be specified, wherein the control further comprises a calculation function via which an achievable chamfer shape is determined on the basis of the desired chamfer shape. The calculation function can in particular carry out a compensation calculation that determines the parameters of the chamfering process such that a distance function is minimized that measures the distance of the achievable chamfer shape from the desired chamfer shape.

In a possible embodiment, a desired chamfer shape can be specifiable in which the chamfer width and/or the chamfer depth and/or the chamfer angle varies/vary over the tooth space.

In a possible embodiment, the control comprises a display function that graphically represents the desired chamfer shape and the achievable chamfer shape to thus make possible a visual comparison of the two chamfer shapes and/or a display function for representing the deviation between the desired chamfer shape and the achievable chamfer shape.

In a possible embodiment, the machining function implements an automatic chamfer machining of one or more edges of the gearing of a workpiece and preferably a plurality of identical workpieces.

The control of the apparatus is preferably programmed such that the apparatus in accordance with the invention automatically carries out the steps described above with respect to their operation and/or use and/or automatically carries out the methods described in the following.

The control in particular has a microprocessor and a memory in which a control program for controlling the apparatus is stored which is worked through by the microprocessor.

The present invention initially protects an apparatus such as has been described in more detail above that is suitable for holding a finger mill in the tool holder and for carrying out the above-described applications. The apparatus in particular has a control that enables the use of such tools for the chamfer machining of an edge.

However, the present invention likewise comprises an apparatus such as has been described above in which a finger mill is held in the tool holder.

The apparatus can be a standalone chamfering machine in a first embodiment.

In a second embodiment, the apparatus in accordance with the invention is in contrast a chamfering machine integrated in a gear manufacturing machining center.

The present invention further relates to a gear manufacturing machining center having an apparatus such as was described above, a gear cutting machine, and a workpiece changer. The gear manufacturing machine is preferably a chamfer cut deburring device or a skiving machine or a gear hobbing machine. The gear manufacturing machining and the chamfering of the workpieces preferably take place in the gear manufacturing machining center in a parallel clock cycle manner. Workpieces gear manufactured by the gear manufacturing machine are in particular transported via the workpiece changer to the apparatus in accordance with the present invention to be chamfered, while the next workpiece is already being gear manufactured on the gear manufacturing machine. A chamfering of the workpiece is also conceivable between a rough machining step and a fine machining step for which purpose the workpiece is preferably traveled from the gear manufacturing machine to the apparatus in accordance with the invention and back again.

The workpiece changer is preferably a ring automation, with further preferably the apparatus in accordance with the invention for chamfering and the gear manufacturing machine being arranged at different angular positions of the ring automation.

The gear manufacturing machine and the apparatus in accordance with the invention preferably have separate workpiece holders. The workpiece changer in this case changes a workpiece after the gear manufacturing machining of the gear manufacturing machine from the workpiece holder there to the workpiece holder of the apparatus for chamfering in accordance with the invention.

In an alternative embodiment, the gear manufacturing machining center can, however, also have a plurality of workpiece holders in which the workpieces remain for the gear manufacturing machining and the chamfer machining. In this case, the workpiece holders are preferably moved from the gear manufacturing machine to the apparatus in accordance with the invention and/or vice versa.

The workpiece changer is preferably used to place workpieces from an external transport path or from other machining stations onto the workpiece holder or workpiece holders and to remove them therefrom.

In accordance with a further aspect of the present invention, the apparatus in accordance with the invention can also be designed as a separate stand-alone machine. It preferably receives gear machined workpieces from a transport path and/or from an automation to chamfer machine them. The correspondingly machined workpieces are then preferably again transferred to a transport path and/or automation again.

The present invention further comprises a process for the chamfer machining of an edge of a toothed workpiece by means of an apparatus such as has been described above.

As part of the method of chamfer machining a toothed workpiece held in the workpiece holder, the tool spindle is preferably moved relative to the workpiece spindle via the at least one linear axis such that a finger mill held in the tool holder is guided in a controlled manner along the contour of an edge of the workpiece to be machined while the workpiece is rotated about its axis of rotation.

The chamfer machining preferably take place such as has been described in more detail above.

The method in accordance with the invention and the apparatus in accordance with the invention can be used both for machining an edge of an external gearing and for machining an edge of an internal gearing.

The workpiece in the simplest case can be a gear wheel having only one gearing. Such workpieces can admittedly also be chamfered using a chamfer cut method. An expensive tool especially adapted to the gearing is, however, required here. The present invention in contrast permits a flexible chamfer machining of substantially any desired geometries.

The method in accordance with the invention and the apparatus in accordance with the invention can be used both for machining an edge of an involute gearing and for machining an edge of a non-involute gearing.

The method in accordance with the invention and the apparatus in accordance with the invention are preferably used for the chamfer machining of a workpiece having a multiple gearing or other interference contours.

The method in accordance with the invention and the apparatus in accordance with the invention can in particular be used for machining at least one edge disposed next to an interference contour, in particular an edge of a multiple gearing.

In a possible embodiment of the present invention, the size of the chamfer can vary while taking account of the stock of following processes over the tooth space.

For example, the chamfer size over the tooth space and in particular the tooth depth can be differently designed so that the size of the chamfer at the finished workpiece is the same everywhere after a following process in which a still remaining trace stock is removed on the chamfering. The removal over the tooth space and in particular the tooth trace can in particular be of different sizes in the follow-up process, for example, which is taken into account by the generation of a chamfer of a different size. The follow-up process can, for example, be a hard fine machining, in particular by grinding.

In a possible embodiment of the present invention, a chamfer is generated in a first machining step, with the first chamfer being measured and correction values being determined therefrom that are taken into account in a second machining step.

In a first possible application, the first machining step is carried out at a first workpiece and the second machining step is carried out at a second workpiece. The chamfer can in particular be produced and measured to full depth on the running in of the process as part of mass production and the machining for the follow-up workpiece can be corrected.

In a second possible application, the first machining step and the second machining step are carried out at the same workpiece, with the first chamfer not yet having the desired depth and then being chamfered to the full depth in the second machining step. Such a procedure is in particular interesting with expensive workpieces, e.g. with larger workpieces or also with very small batch sizes.

The control of the apparatus can furthermore have an input function via which the measurement values can be input and/or can be transferred to the control, with a calculation function of the control determining the correction values.

DETAILED DESCRIPTION OF THE DRAWINGS

The present invention will now be explained in more detail with reference to embodiments and to Figures.

Figure 1B:
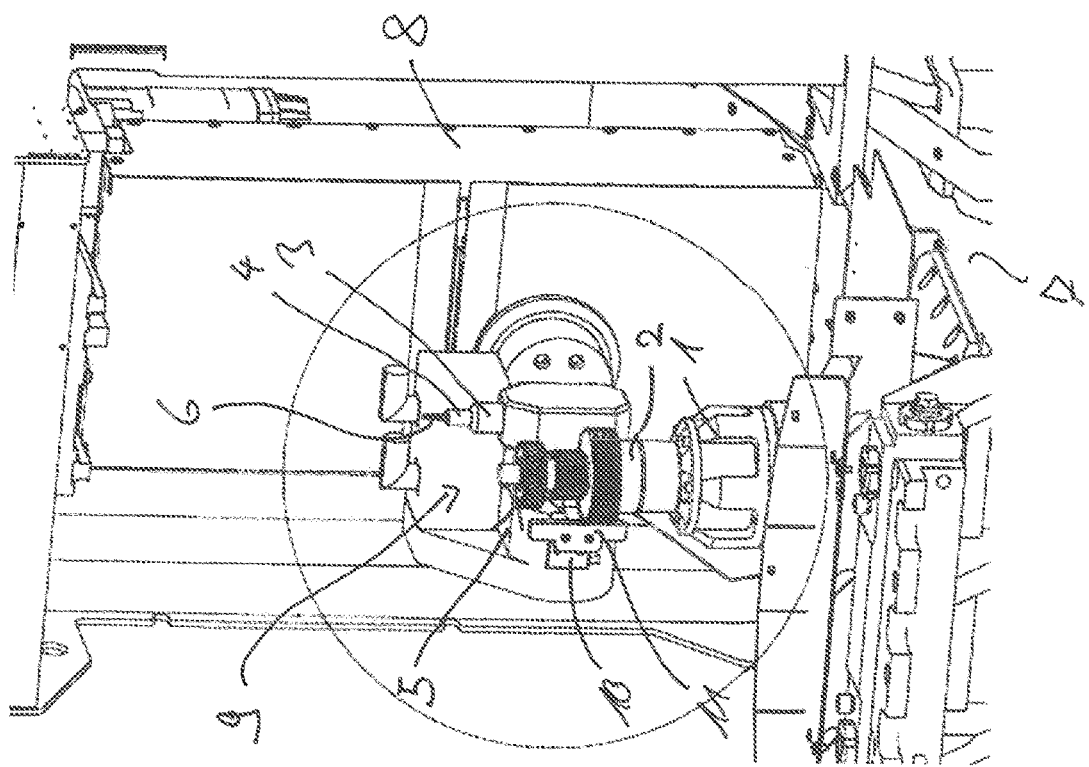
Figure 2:
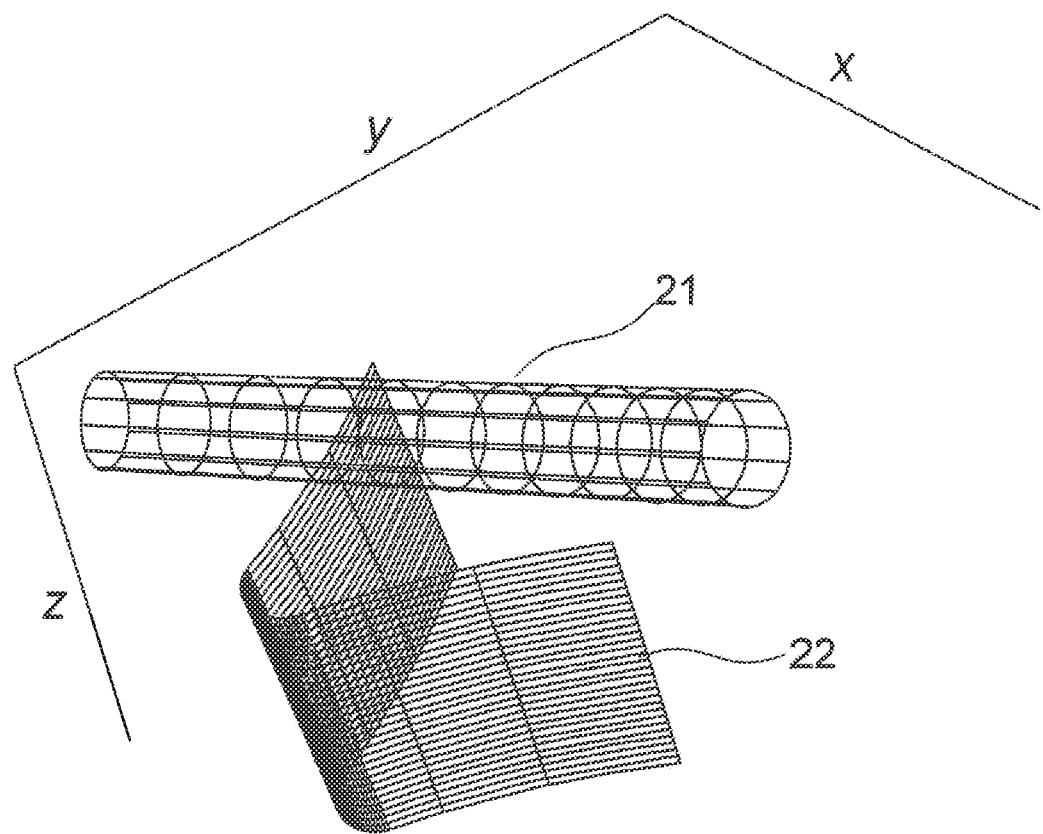

There are shown:

FIG. 1A and FIG. 1B: An embodiment of a gear manufacturing machine in accordance with the invention;

FIG. 2: The tool can be recognized (a conical gear hob 21 here that is supplied in a tooth space and generates a chamfer. The gear hob touches the lines 22 that represent the tooth space up to the height at which the chamfer starts.

Figure 3:
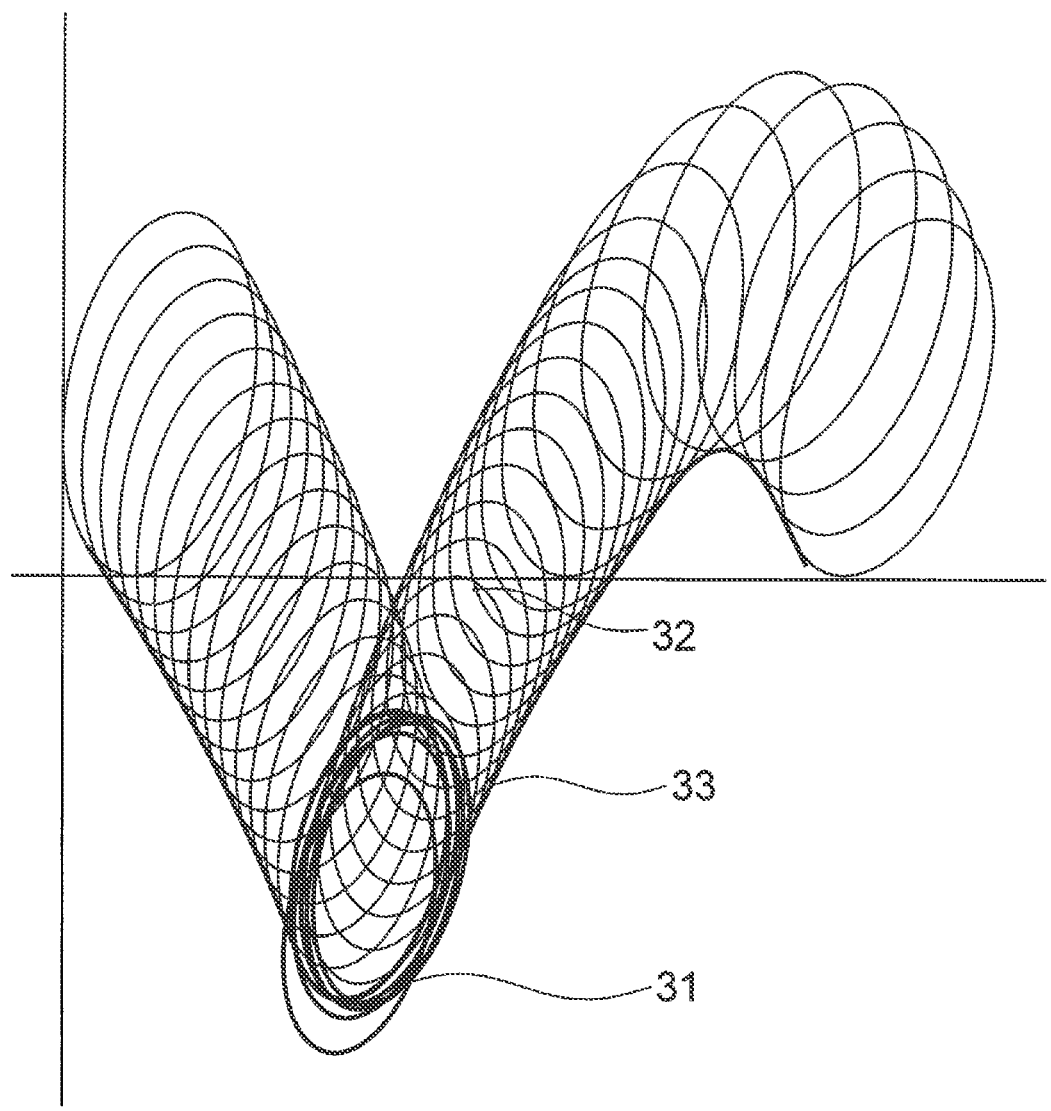

FIG. 3: The plane sections of the tool (here a conical gear hob) and the transverse sectional plane at the height at which the chamfer starts are shown as ellipses. The line 33 shown in bold is the profile line. The ellipses 31 printed in bold are the gear hob positions in which the gear hob does not contact the profile line, but intersects it. These collisions arise in the example shown close to the dedendum on the right trace. This means that the tooth trace and also the dedendum are damaged by the finger mill. These positions have to be avoided. The collisions above all occur in the dedendum, which can be recognized in that the ellipses that do not generate any collision 32 predominate at the tooth trace.

Figure 4:
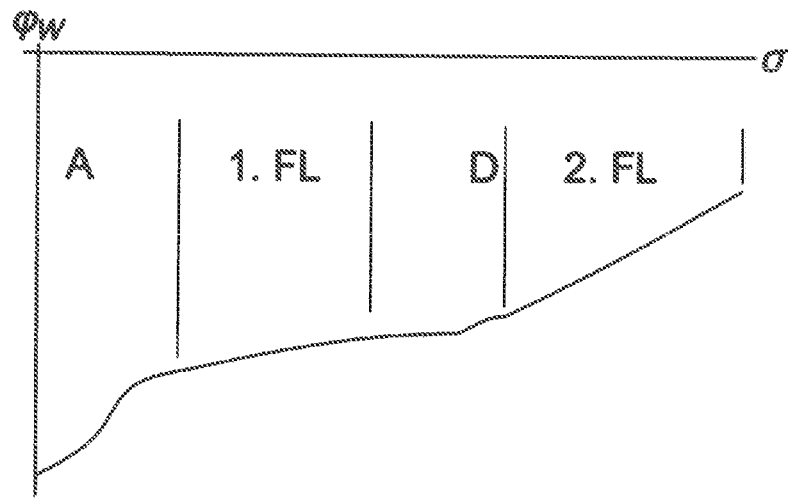

FIG. 4: The calculated kinematics is applied against the milling progress σ for a parameter set of the angle of rotation of the tool $\varphi_W$. The extent is not linear here, which shows that the angle of rotation cannot be simply specified, but rather that the angle of rotation results from the kinematic calculation. In contrast to the kinematics shown in FIG. 6, the workpiece does not rotate back.

Figure 4A:
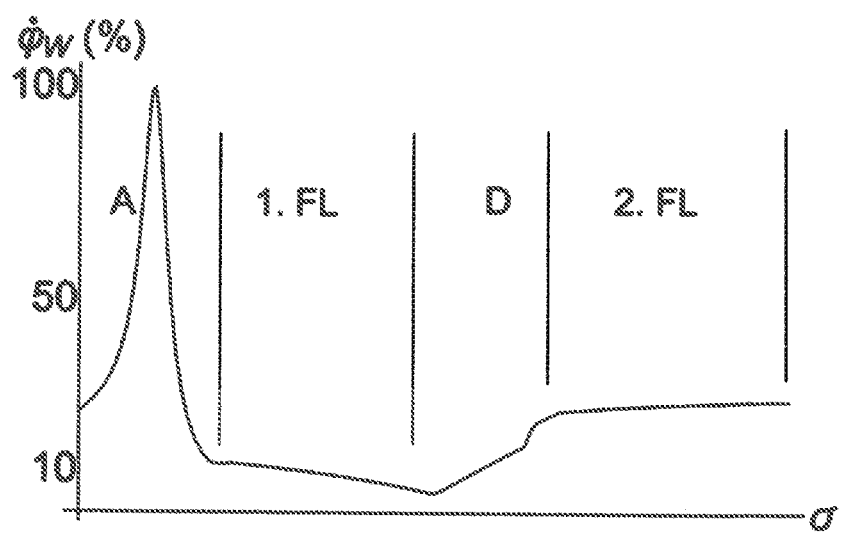

FIG. 4A: The rotational speed $\dot{\varphi}_W$ is shown in FIG. 4a against the milling progress σ for the same kinematics of which the angle of rotation $\varphi_W$ is shown against the milling progress σ in FIG. 4.

Figure 5:
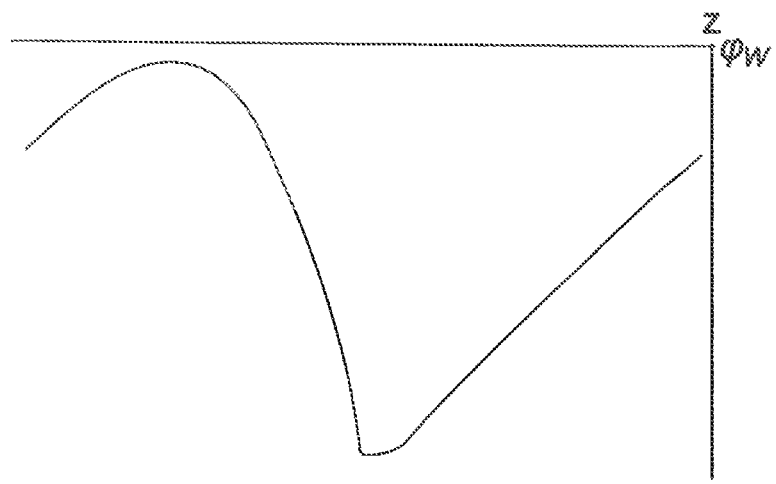

FIG. 5: The gear hob height z is applied against the angle of rotation of the workpiece $\varphi_W$ for the same kinematics of which the angle of rotation $\varphi_W$ is shown in FIG. 4.

Figure 6:
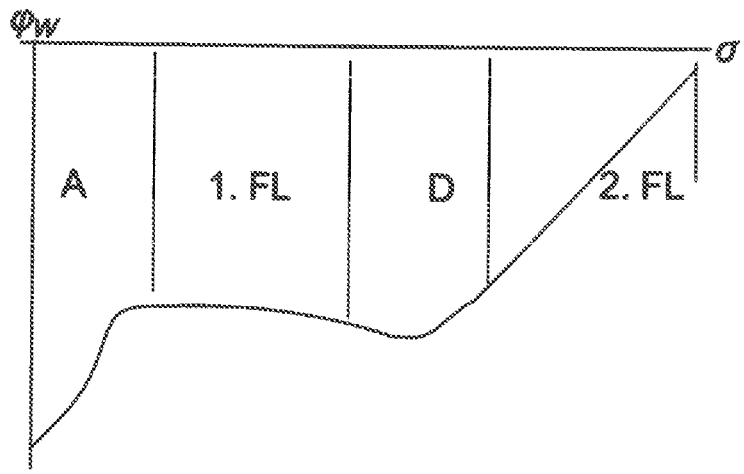

FIG. 6: The angle of rotation of the workpiece $\varphi_W$ is applied against the milling progress σ for a parameter set differing from the kinematics shown in FIGS. 4 and 5. It can be clearly recognized here that the workpiece has to rotate back during the machining.

Figure 6A:
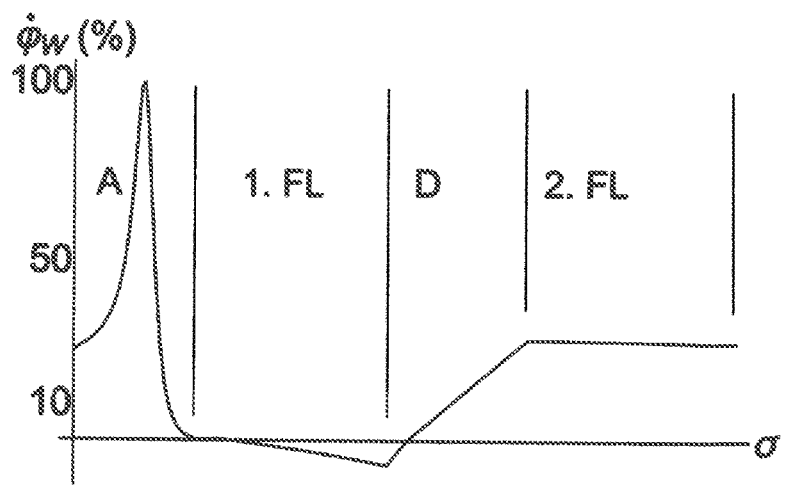

FIG. 6A: The rotational speed $\dot{\varphi}_W$ is shown in FIG. 6A against the milling progress σ for the same kinematics of which the angle of rotation $\varphi_W$ is shown against the milling progress σ in FIG. 6.

Figure 7:
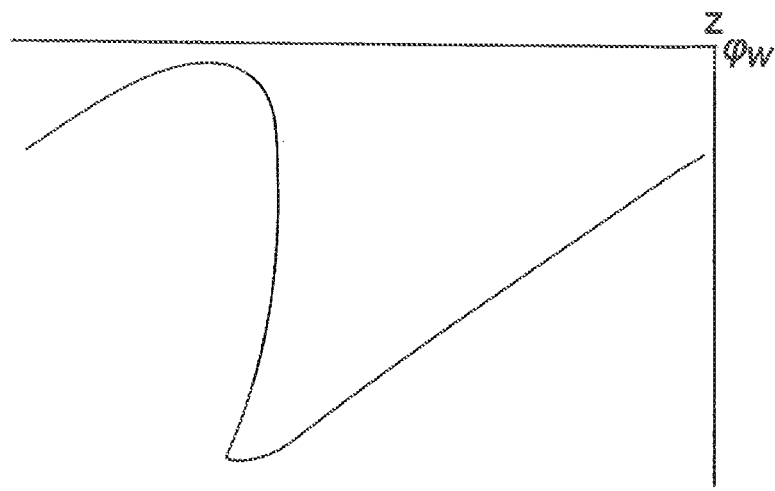

FIG. 7: The gear hob height z is applied against the angle of rotation of the workpiece $\varphi_W$ for the same kinematics of which the angle of rotation $\varphi_W$ is shown in FIG. 6. The effect of the rotating back of the workpiece can be clearly recognized.

Figure 8:
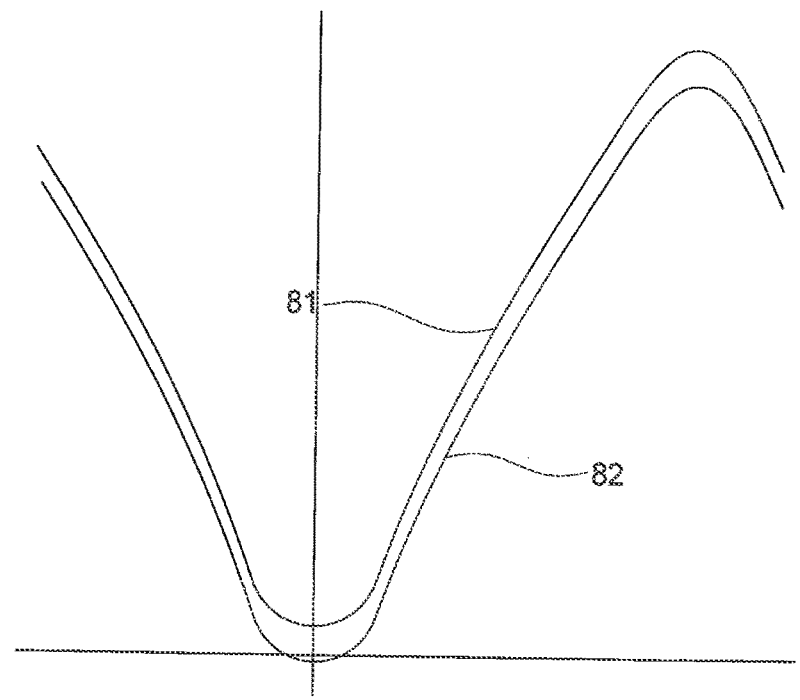

FIG. 8: Two profile lines in transverse section can be recognized. The upper curve 81 describes the profile line at the height at which the chamfer starts; the lower curve 82 describes the profile line of the chamfer at the front face of the gear wheel. Since it is a helical gear in the example, the upper profile line is rotated such that the symmetry of the chamfer can be evaluated. The symmetry of the calculated chamfer can be clearly recognized.

Figure 9:
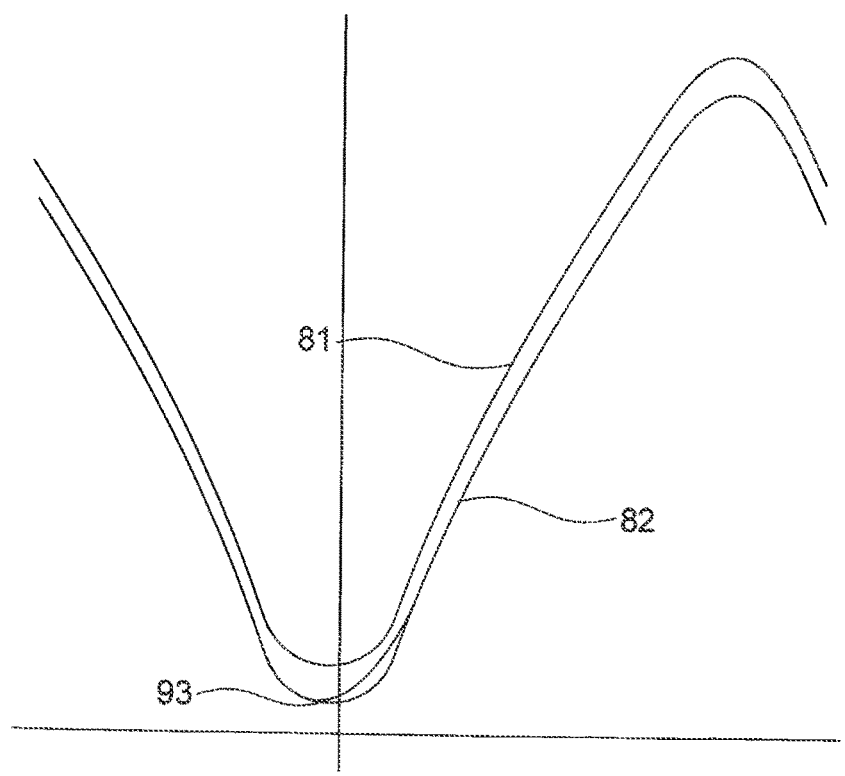

FIG. 9: Since the gear hob has a greater radius than the dedendum radius, collisions occur (see FIG. 3) if the complete dedendum rounding were chamfered. The kinematics therefore have to be correspondingly adapted. This adaptation has the result that the chamfer is not exactly reached. This effect is shown by the middle line 93. This does not change anything about the symmetry of the chamfer on the right and left traces.

Figure 10:
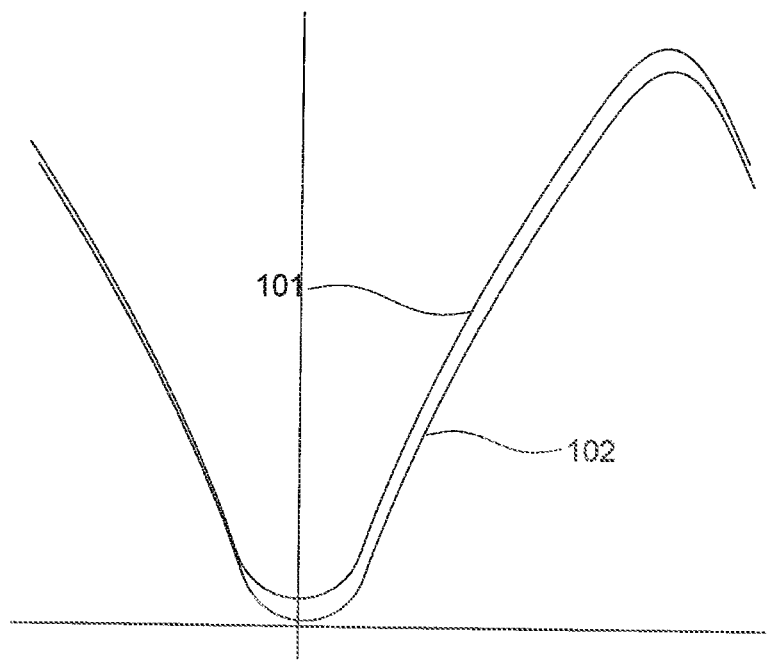

FIG. 10: A different chamfer is defined by a different choice of the parameters. The chamfer becomes asymmetric with the same specifications as in the chamfer shown in FIG. 8, but with amended parameters. As in FIG. 8, the FIG. shows the already rotated profile lines (101 and 102 here) so that the comparison is possible.

Figure 11:
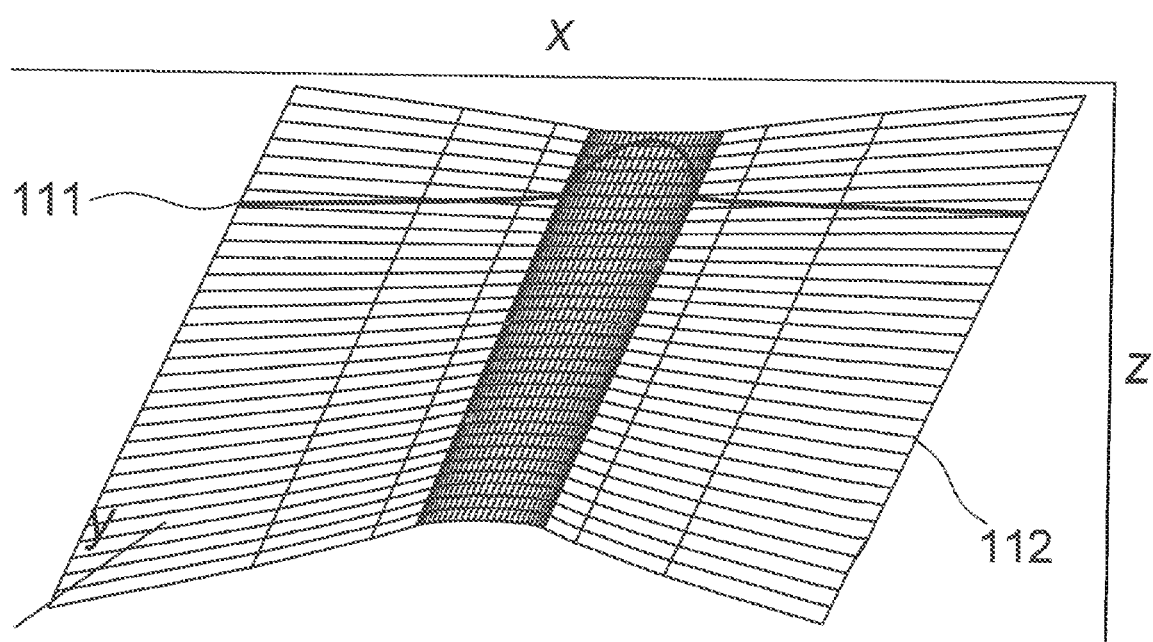

FIG. 11: The start of the chamfer can be given by a smooth Jordan curve for the method presented here. This curve can be disposed in a transverse section, but does not have to be. Such a curve 111 is reproduced here. The traces should be chamfered here, whereas no pronounced chamfer is required in the dedendum. The tooth space is given by the grid 112.

Figure 12:
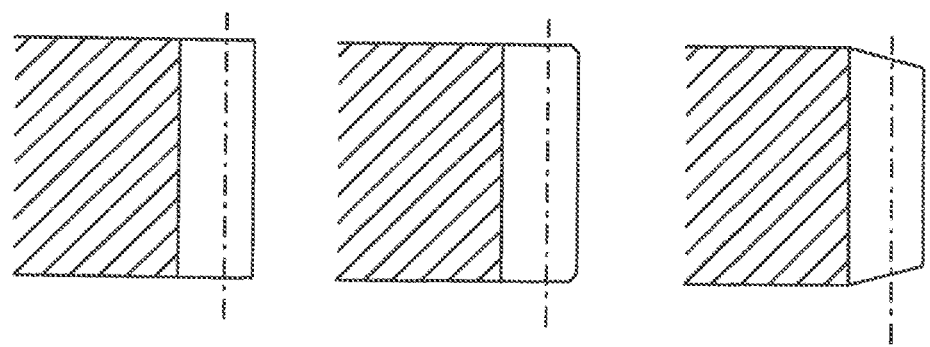
Figure 12:
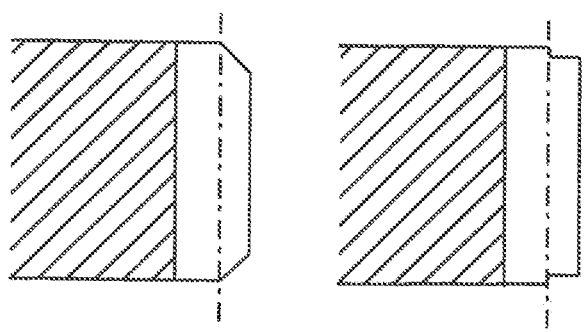

FIG. 12: A plurality of gearing arrangements can be recognized in the upper line that can be deburred using the Gratomat®. In the lower line, in contrast, two gearing arrangements can be recognized that are chamfered or stepped from the pitch circle onward. These gearing arrangements cannot be deburred using the Gratomat®. The deburring or chamfer machining of all these gearing arrangements is not a problem with the methods presented here.

Figure 13:
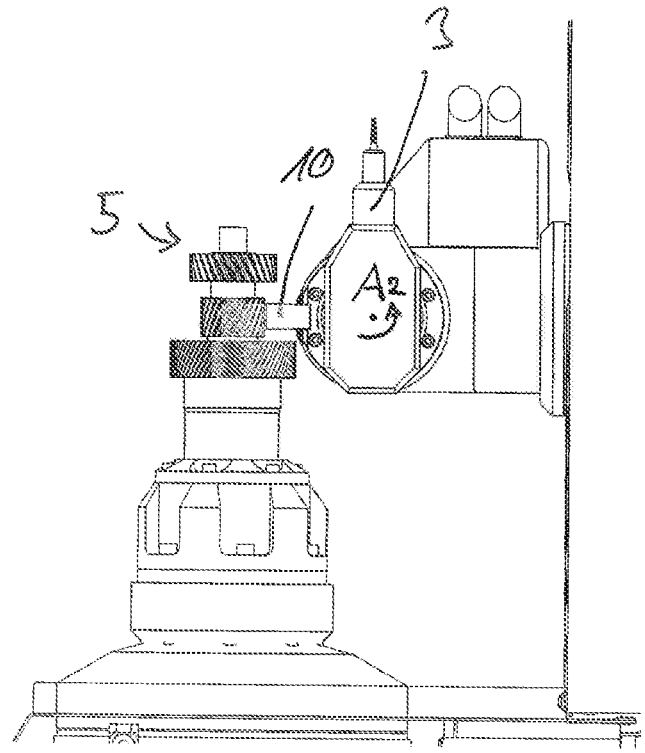

FIG. 13: The use of a meshing sensor arranged at the machining head of the apparatus for measuring an external gearing.

Figure 14:
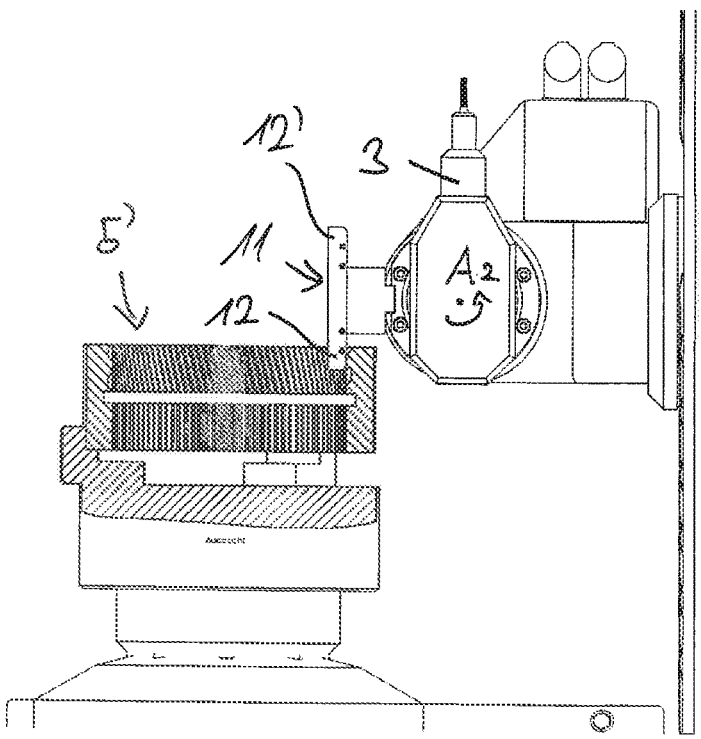

FIG. 14: The use of a meshing sensor arranged at the machining head for measuring an internal gearing.

Figure 15:
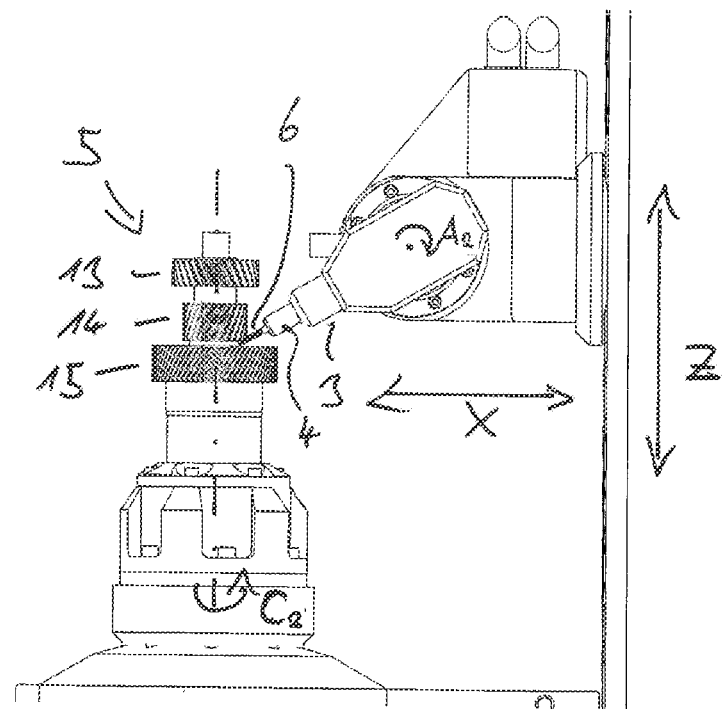

FIG. 15: The chamfer machining of a lower, inwardly disposed edge of gearing with a workpiece having a multiple gearing.

Figure 16:
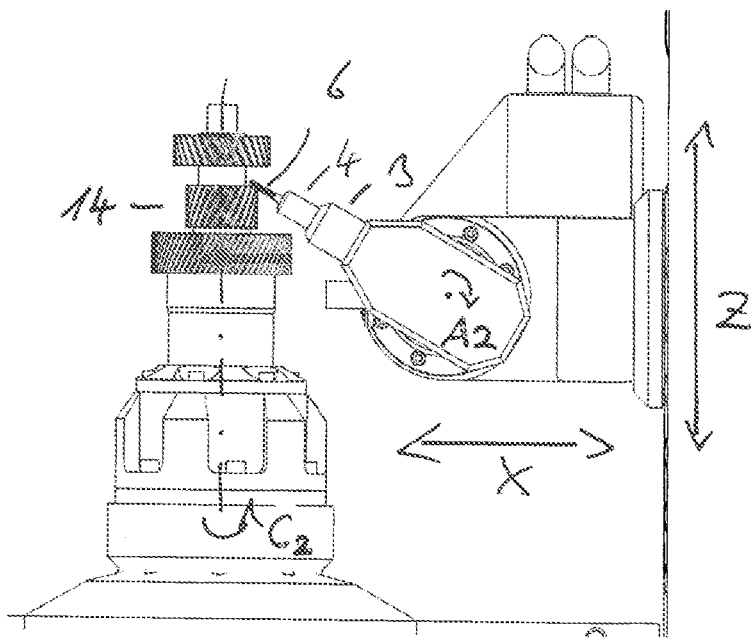

FIG. 16: The chamfer machining of an upper, inwardly disposed edge of gearing with a workpiece having a multiple gearing.

Figure 17:
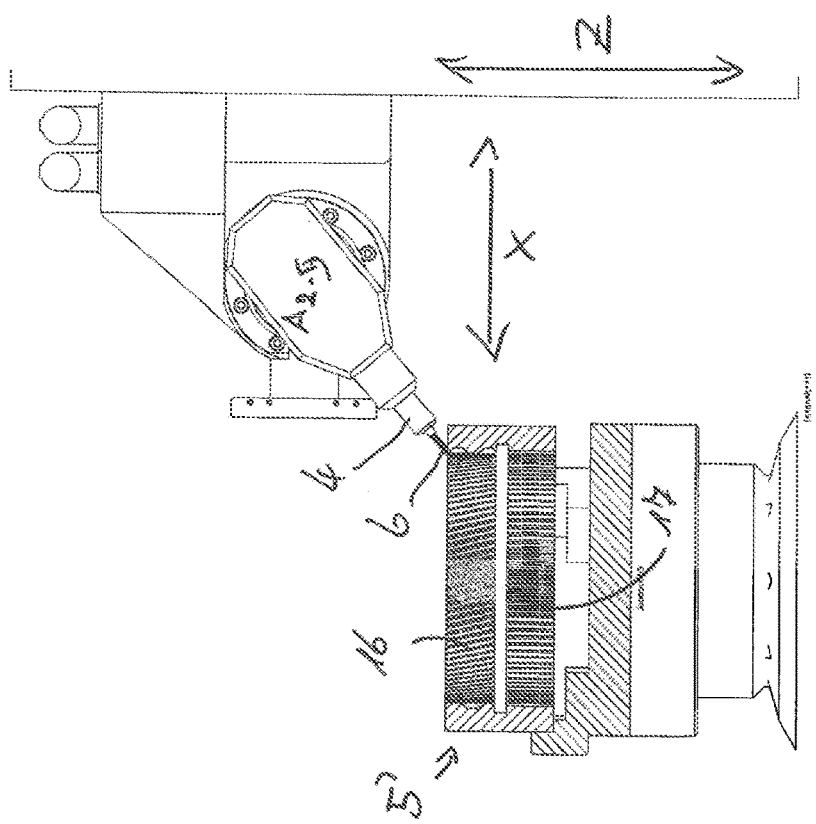
Figure 18:
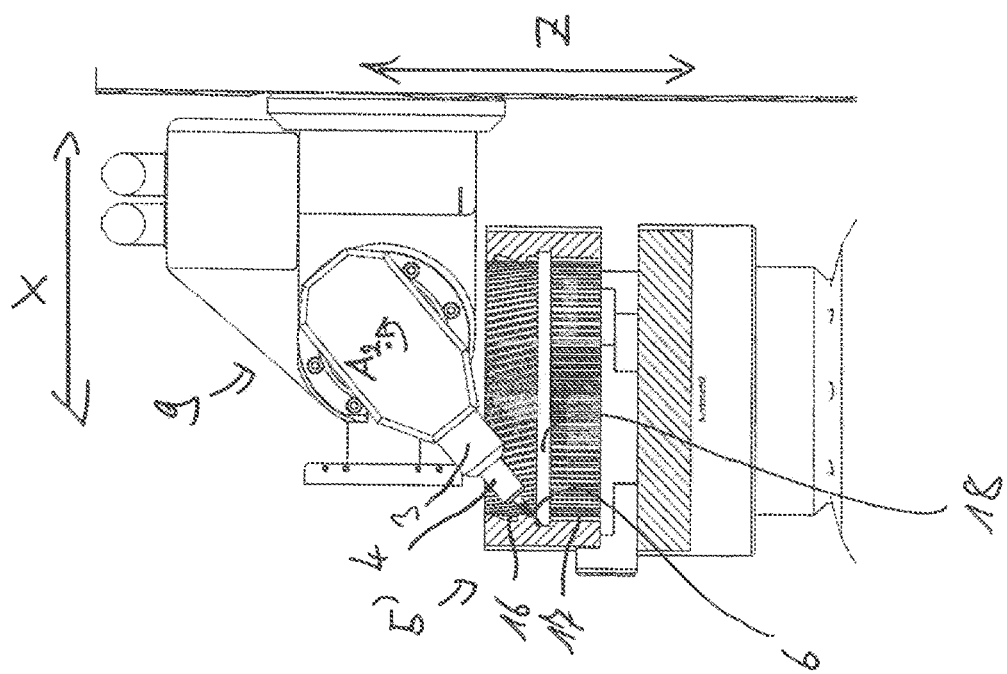
Figure 19:
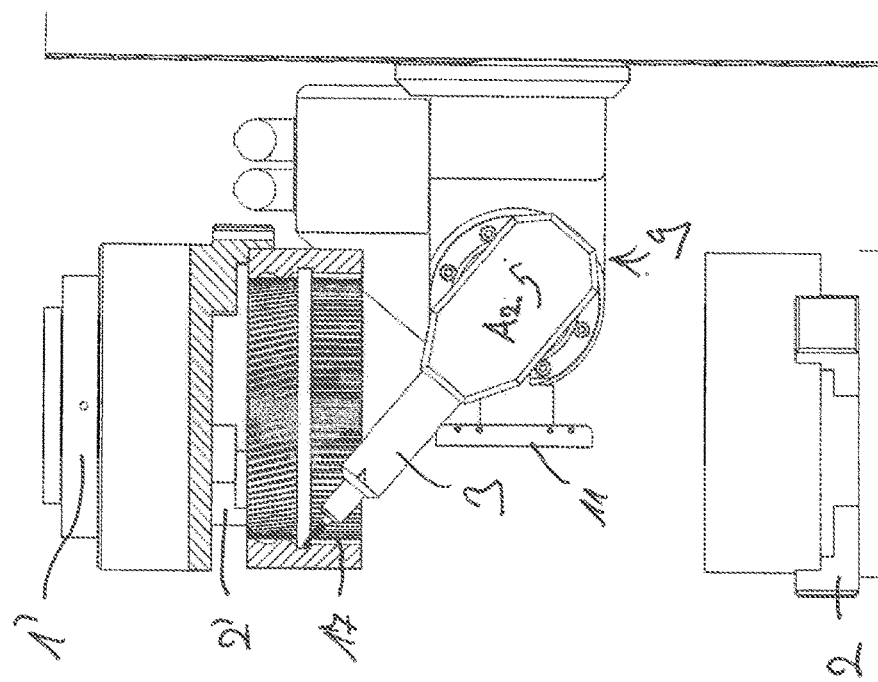

FIG. 17: The chamfer machining of an inwardly disposed edge of an internal gearing with a workpiece having a multiple gearing, for which purpose the finger mill is traveled via the machining head over the table center;

FIG. 18: The chamfer machining of an outer edge with the workpiece shown in FIG. 17 with internal gearing;

FIG. 19: The machining of the other inner edge of the workpiece shown in FIGS. 17 and 18 with internal gearing, for which purpose the workpiece is gripped and raised via an upper workpiece holder so that the internal gearing is accessible from below; and FIG. 20: The chamfer machining of the other outer edge in the workpiece shown in FIGS. 17 to 19 with an internal gearing.

DETAILED DESCRIPTION

The invention describes a method of deburring or chamfering gearing using a finger mill. The gearing can in particular be straight or helical spur gear teeth that can be configured both as cylindrical and conical (beveloid gearing).

The gear teeth can be both symmetrical and asymmetrical, i.e. the profile angles of the left and right traces can, but do not have to, be different. The profiles of the gear teeth can be selected as desired, in particular also as involutes.

The gear teeth can be configured as external gearing, but also as internal gearing.

The finger mills can be cylindrical or conical.

The method described in the following differs from the method underlying the Gratomat® in that whereas in the Gratomat® the gear hob is pressed onto the teeth by a spring force, in the method present here the exact motion kinematics are calculated and they are implemented by the machine. A predefined chamfer can thereby be generated. The implementation of the motion kinematics preferably takes place by NC axes of the machine.

The speed of the table rotation in the method proposed here is generally not constant, in contrast to the method of the Gratomat® (see FIGS. 4 and 6), but rather varies over the tooth space.

The direction of rotation of the gear hob can be selected as desired in contrast to the method of the Gratomat®.

The underlying idea of the invention will be looked at in more detail in the following.

The following definitions are required to formulate the relationships mathematically:

The following terms are used for transformations:

$R_x(\varphi)$ rotation by the angle $\varphi$ about the x axis. Analogously for y and z.

$T_x(v)$ translation by the path v in the x direction. Analogously for y and z.

$H(A_1, \ldots, A_N)$ general transformation describable by a homogenous matrix with a total of N coordinates $A_1$ to $A_N$.

The term "coordinates" is used here for generalized, not necessarily independent coordinates.

The axis of rotation of the gearing in its system of rest always coincides with the z axis.

It is furthermore important for the formulation of the relationships to define the kinematic chains which describe the relative positions between the workpiece and the tool.

In the following, values which relate to the tool are provided with the index T and those which relate to the workpiece are provided with the index W.

Kinematic Chain

The relative position between the tool and the workpiece is described by the following kinematic chain $K_R$:

$$K_R = R_z(\varphi_W) \cdot T_z(z_T) \cdot T_y(y_T) \cdot T_x(d) \cdot R_y(\gamma) \cdot R_x\left(\omega - \frac{\pi}{2}\right) \cdot R_z(\varphi_T)$$

$\varphi_T$: Angle of rotation of the tool $\omega$: Attack angle of the gear hob for the gearing $\gamma$: Axial cross angle between the axis of rotation of the gear hob and the axis of rotation in the gearing (z axis)

$y_T$: Amount of the translation of the gear hob from the center of the gearing d: Distance of the gear hob from the center of the gearing $z_T$: Amount of the translation of the gear hob along the axis of rotation of the workpiece $\varphi_W$: Angle of rotation of the workpiece Calculation takes place in the reference system of the workpiece.

This kinematic chain initially serves the mathematical description of the invention described here. The coordinates used do not have to match the physical axles of the machine on which the invention is used. If a special machine has a movement apparatus, which makes possible relative positions between the tool and the workpiece in accordance with a transformation $$H(A_1, \ldots, A_{N_S}) \text{ where } N_S \geq 1$$

the invention can be used on this machine when there are coordinates $A_1, \ldots, A_{N_S}$ for each set of coordinates from the kinematic chain just described, where $$H(A_1, \ldots, A_{N_S}) = K_R.$$

The calculation of the coordinates $A_1, \ldots, A_{N_S}$ can be carried out by means of a coordinate transformation.

FIGS. 1A and 1B show an embodiment for a working area of a gear manufacturing machine having a movement apparatus present there whose coordinate axes coincide with those used in the definition of the kinematic chain.

There is the following association between the movement axes of the apparatus that will be described in even more detail in the following and the coordinates, i.e. a change of the respective coordinate takes place by a travel movement of the respective axis.

Axis of rotation B3 of the tool holder—$\varphi_T$: Angle of rotation of the tool.

Second pivot axis A2—$\omega$: Attack angle of the gear hob for the gearing.

First pivot axis A—$\gamma$: Axial cross angle between the axis of rotation of the gear hob and the axis of rotation of the gearing (z axis).

Third linear axis Y or V—$y_T$: Amount of the translation of the gear hob from the center of the gearing.

First linear axis X—d: Distance of the gear hob from the center of the gearing.

Second linear axis Z—$z_T$: Amount of the translation of the gear hob along the axis of rotation of the workpiece.

Axis of rotation C2 of the workpiece holder—$\varphi_W$: Angle of rotation of the workpiece.

The tool (here the finger mill) is supplied in a space (see FIG. 2) and generally travels via one or more axes that are given by the parameters $\omega$, $\gamma$, $y_T$, d, $z_T$, and $\varphi_W$.

The rotational axis of the tool is slanted (generally skewed) to the axis of rotation of the workpiece during the machining.

Since the general movement apparatus permits a plurality of movements, curves on the chamfer, e.g. the start and end of the chamfer, can generally be specified as general smooth Jordan curves. The curves generally do not have to be in a transverse sectional plane (see FIG. 11 for a possible defined start of a chamfer).

Workpieces that do not have a planar end face can also be allowed for the method presented here. Possible workpieces can be observed in FIG. 12. The shapes of the end face shown in the upper line can be chamfered both by the Gratomat® process and by the method presented here. In contrast, the tooth traces are shown in the lower line that are chamfered or stepped from the pitch circle by way of example. The method of the Gratomat® cannot machine those workpieces, whereas the method presented here can chamfer this workpiece. The Jordan curve is selected accordingly for this purpose.

It can be imagined for this example to select the start of the chamfer such that a chamfer of the same height is produced over the total trace width. Such a curve could be selected as a displacement downward of the non-planar end face by a defined amount. It is, however, also possible to predefine the curve in the manner such as is described in FIG. 11. The width of the chamfer can furthermore also be selected such that initially after the chamfer machining a width results that changes over the tooth space and that is, however, configured with respect to the removal in follow-up processes such that a chamfer of the same height results over the total tooth space at the finished workpiece.

For the general case, the relationships that are produced by the condition that the gear hob has to contact both curves tangentially have to be solved. This means that three of said parameters ($\omega$, $\gamma$, $y_T$, d, $z_T$) can be specified.

The relationships are set up as follows: Three equations for the equality of points and an equation for the tangential contact. This has the result that four free variables are required to solve the equation system comprising the four equations. For the first contact, they are the two variables that parameterize the surface of the gear hob, the angle of rotation of the tool $\varphi_W$, and a further parameter, e.g. the gear hob height $z_T$. These relationships can, for example, be formulated and solved for a discrete number of points on the curve. The sought parameters are thus obtained as a function of the position of the point on the chamfer.

If now a further Jordan curve is present, four further equations are added as conditions to the previous equation system. This means that an equation system of 8 equations now has to be solved. In this case, two variables of the parameterization of the gear hob surface (per contact point, that is, a total of 4), the parameterization of the second curve, the angle of rotation of the workpiece $\varphi_W$, and two further parameters, e.g. the gear hob height $z_T$ and the axial cross angle $\gamma$ are available for this purpose.

The chamfer can now be very freely specified. The chamfer angle can in particular be specified along the space contour. The gear hob can be universally used since the chamfer shape is generated by the machining kinematics. A limitation of the chamfer shape substantially only results from the diameter of the gear hob since, when this was selected as too large in comparison with the gearing, collisions that have to be avoided arise, in particular in the dedendum.

A smooth Jordan curve can be specified as a special case of the general case and can implicitly define the chamfer by the selection of the parameters $\omega$, $\gamma$, $y_T$ and selectively of the displacement $z_T$ or of the distance d. This curve likewise does not have to be in a front plane. A possible example can be seen in FIG. 11.

In this case, only the relationship is solved that is produced by the condition that the tool tangentially contacts the one curve.

The chamfer can be selected as symmetrical (see FIG. 8) or also asymmetrical (see FIG. 10) by a suitable choice of the parameters.

The chamfer implicitly defined in this manner can be determined with the aid of a removal simulation from the previously determined kinematics and from the tool. In this removal simulation, where material is removed and, starting from the unmachined geometry, the end contour of the gearing and thus also of the chamfer is determined while taking account of the geometry of the gear hob and of the trajectory of the gear hob relative to the gearing traveled in the machining process. Such removal simulations are known for various cutting processes.

The invention also provides in a preferred variant that the control of the apparatus has a function for inputting a parameter of the desired chamfer shape. This parameter of the chamfer shape can, for example, be a chamfer width and/or a chamfer depth and/or a chamfer angle and/or a symmetry property.

The control preferably comprise a function for determining the chamfer shape from one or more parameters of the space contour of the gearing that is to be chamfered. In the special case of involute gearing, they would inter alia be the profile angle or angles, the helix angle, the tooth thickness, and the shape of the dedendum, as well as optionally the shape of the head edge break. It can in particular be one or more parameters that are already present in the control from the starting of the gear manufacturing process by which the gearing is produced or that can be input via a function for dressing the gear manufacturing process.

The chamfer shape is preferably determined using the input parameter of the chamfer shape and the one or more parameters of the space contour.

This variant of the invention is characterized in that only a few parameters have to be input in addition to the parameters already input in the control for the definition of the gearing, whereby the work preparation is simplified. A connection to an external computer system and a data transmission from an external computer system are also not necessary.

An expanded form of the invention provides that the chamfer width and/or the chamfer depth and/or the chamfer angle can be directly changed via the profile of the gearing and the control preferably provides a corresponding input function. It is thus possible, for example, for it to be able to input that the chamfer angle in the region of the addendum of the gearing is greater than in the region of the dedendum of the gearing.

The most general form of the definition of the chamfer provides that it is digitally transferred to the control, for example via a 2D or 3D data format.

The control can determine the kinematics that best approximate the chamfer or even at least theoretically exactly produce the chamfer from these definitions. How good the approximation is will depend on the variant of the invention used.

If the variant is selected in which two Jordan curves are taken into account for the calculation, a very good approximation is achieved. If a variant is selected in which only one Jordan curve is specified, for example the variants in which the parameters $\omega$, $\gamma$, $y_T$ are selected and in which selectively a shift $z_T$ or the distance d is determined, the chamfer will generally only be able to be approximated. The invention in this case provides a control that determines the parameters ω, γ, $y_T$ such that the chamfer is approximated as well as possible. This determination preferably takes place via a compensation calculation that determines the parameters such that a distance function minimizes that measures the distance of the achievable chamfer from the desired chamfer. A simple distance function would here be a sum of the distance squares of a discrete number of points of the achieved contour 82 to the desired curve.

The parameters substantially have the following effect on the chamfer shape: ω increases or decreases the chamfer angle along the tooth contour, γ and $y_T$ respectively increase the chamfer angle on a trace and decrease it on the other and cause a change of the chamfer angle from the addendum to the dedendum, $\varphi_W$ increases the chamfer width on a trace and decreases it on the other. All these effects are, however, automatically taken into account by the compensation calculation.

The control preferably has a display function that graphically represents the desired chamfer shape and the theoretically achievable chamfer shape to thus make possible a visual comparison of the two chamfer shapes and/or a display function for representing the deviation between the desired chamfer shape and the theoretically achievable chamfer shape.

In the special case that ω, γ, and d are specified, an ideal $y_T$ can be determined, it can be fixedly set, and only the gear hob height $z_T$ traveled so that the resulting chamfer is symmetrical (see FIG. 8). If $y_T$ is not selected as ideal, the resulting chamfer becomes asymmetrical (see FIG. 10).

To determine the ideal $y_T$ for given parameters, a plurality of simulations can be carried out with different assumed $y_T$ values and the simulated chamfer can be evaluated in an automated manner with respect to the desired property (e.g. symmetry). A parameter that is suitable is thereby obtained in an automated manner to generate the desired chamfer.

If the already introduced special case is considered that only one curve is present, here the profile line at which the chamfer starts, and if only the gear hob shift in the direction of the axis of rotation of the workpiece is calculated, i.e. the angle of attack ω, the axial cross angle γ, and also the two shifts d and $y_T$ are specified, kinematics are obtained that describe the coupling between the rotation of the workpiece $\varphi_W$ and the gear hob height $z_T$. They are shown in FIG. 5 and FIG. 7 for different parameters.

The tool is preferably to be traveled such that the cut volume is approximately the same size at all times. This prevents an overload of the gear hob and promotes a longer service life thereof.

The gear hob is traveled along the curve that parameterizes the profile line with a constant feed for this reason. The distance that is produced as a traveled curve is called the milling progress σ here.

If the angle of rotation from the calculated kinematics is applied against the milling progress, it can be recognized that the explicit calculation of the angle is necessary since there is no linear relationship between the milling progress and the angle of rotation of the workpiece (see FIG. 4 and FIG. 6). No uniform rotational speed for the workpiece can thus be used during the machining. It is even possible that the workpiece has to rotate back during the machining to satisfy the kinematics (see FIG. 6).

As can be seen from FIGS. 4A and 6A, the rotational speed and the rotational acceleration are the highest in the region of the addenda. The two traces are furthermore machined at a different rotational speed. In the region of the dedendum, a corresponding change of the rotational speed from the one trace to the other is carried out so that a greater rotational acceleration is produced than on the traces. The rotational speed can likewise vary within one or both of the traces.

The abbreviations in FIGS. 4, 4A, 6, and 6A stand for:
A=addendum
D=dedendum
1.Fl=first trace
2.Fl=second trace A further special case of the general case would be that a smooth Jordan curve is specified on the chamfer (e.g. the start of the chamfer) as in the first special case, but this time the parameters $z_T$, ω, γ, and $y_T$ are fixedly set and only the kinematics are calculated how d has to be traveled to produce the chamfer. The advantage of this process is that chamfers can also be applied at points that only permit a little space in the z direction. This process should preferably also be used with these problematic relationships since the gear hob would only be loaded in one region in contrast to the first special case.

The combination of the two previous special cases is a further special case. Neither $z_T$ nor d is fixed. For this purpose, as also in the previous special cases, a smooth Jordan curve is specified on the chamfer (e.g. the start of the chamfer), the parameters ω, γ, and $y_T$ are fixedly set, but now five variables have to be used instead of four to solve the equation system. This means that an underdetermined equation system has to be solved. It is therefore not necessary here to indicate an additional condition (this could be an exact position of the contact point on the gear hob) or to carry out a compensation calculation, with here the gear hob load being able to be distributed over the total gear hob. Since a greater region of the gear hob is thereby used, this results in a longer gear hob service life.

Additional conditions can also be introduced with a compensation calculation. This then results in a non-linear optimization problem.

These additional conditions could be demands of a technical nature that a certain gear hob height may not be exceeded or that there may not be any collisions with other gearing or with a collar. The shift d can thus e.g. be determined such that the gear hob only projects a fixedly defined distance over the root radius. It is, however, also possible that the height of the gear hob has to be restricted due to a collar. The shift $z_T$ can be selected for this purpose such that no collision with the collar takes place in the critical region, but the wear is, where possible, distributed over the total gear hob length in the non-critical region. In the critical region, above all d is therefore traveled, but in the critical region d is then left constant and $z_T$ is traveled.

This method is of particular interest with respect to gearing arrangements having a large gear tooth height. No sufficiently large finger mills are available for them so that the first special case cannot be applied that only the gear hob height $z_T$ is traveled. The second special case that only the delivery d is traveled results in very non-uniform tool wear. For this reason, the combination of the two special cases is selected that both d is traveled so that the total gearing can be chamfered and that $z_T$ is likewise traveled so that the wear is uniformly distributed over the tool.

A further special case is the chamfering of internal gearing arrangements. It is necessary for this to work over the table center in special cases. This can become necessary if the gearing cannot be directly reached at one end.

The gear hob is then traveled in accordance with the already described cases, both the special cases and the general case, but in the interior of the gear wheel.

A representation of this method can be seen in FIGS. 16 to 20.

If the gear hob diameter is larger than the root radius of the gearing, collisions naturally occur on the machining. This can be visualized as in FIG. 3.

The sections of the conical or cylindrical gear hob there with the transverse sectional plane at the height of the profile line at which the chamfer starts are shown as ellipses.

The ellipses at the right and left traces share only one respective contact point with the profile line, whereas the ellipses drawn in bold share a plurality of intersections with the profile line. This means that, provided that the gear hob is traveled along the profile line, the tool not only applies a chamfer, but damages the trace or the dedendum (drawn ellipses in FIG. 3).

This must be corrected in that the positions that result in collisions are not traveled to by the gear hob. The chamfer is thereby changed and the middle line in FIG. 9 is obtained that results as the envelope surface of the ellipses that only share exactly one contact point with the profile line.

Optionally, these collisions can also be prevented by use of a ball cutter whose diameter is smaller than the diameter of the dedendum rounding.

If a chamfer is generated at the workpiece in accordance with the method described here, there is the possibility of correcting the chamfer. Corrections become necessary when the exact machine geometry is possibly not known or if the gearing is possibly manually centered.

A possible correction would be the desired shift of a chamfer in the axial direction. This means that a desired correction relates to the $y_T$ value. To calculate the required change from this, a plurality of simulations can also be carried out with different parameters as also with the calculation of an ideal $y_T$ value. The parameter $y_T$ can be determined by this variation such that the desired chamfer is generated.

This principle can also be used for the remaining parameters $\omega$, $\gamma$, and d. The influences on the chamfer shape, in particular the symmetry of the chamfer, the axial position of the chamfer, the chamfer angle, and the extent of the chamfer angle can thus be determined over the total space for all these parameters. If the influences are known, the parameters can be determined such that the desired chamfer shape is achieved.

A first chamfer that does not yet have the desired depth or height can in particular first be milled at large components and it can then be measured. Necessary corrections thereby become noticeable that can be calculated according to the just described method. They can then also be taken into account when the remainder of the chamfer is milled, i.e. the chamfer to its full depth or height. Rejects can thus be avoided.

The corrections described here can be necessary if, for example, the geometry of the finger mill does not exactly correspond to the one assumed in the calculation. This can be caused, for example, by a non-exact measurement of the finger mill and/or by wear.

The corrections described here can alternatively or additionally also be necessary when, for example, the relative position of the finger mill for the gearing does not exactly correspond to that assumed in the calculation. This can be caused, for example, by an inexact measurement of the apparatus and/or by an uncompensated or insufficiently compensated thermal growth of the apparatus and/or by an imprecise meshing of the finger mill in the gearing.

The required corrections can be input, for example, via the control, transmitted digitally to the machine, or determined from a measurement of the chamfer achieved and from a subsequent desired/actual comparison. The measurement can take place both in the apparatus and on an external measuring machine. The measurement in the machine provides the advantage that the setting of the process and the determination of the corrections can take place fully automatically when the measured values are directly transferred into the control.

The variant of the invention that does not provide the traveling of all the available axes during the chamfer machining has the advantage with respect to a variant in which all the axes are traveled that all the axes do not have to be configured as NC axes or at least do not have to be suitable for being traveled during the chamfer machining. An apparatus can thereby be configured less expensively.

The present invention will be shown again in the following with reference to the embodiment in FIGS. 1A and 1B and with reference to the machining situations shown in FIGS. 13 to 20. All the aspects that have previously been described can be combined with the following representation and vice versa.

FIGS. 1A and 1B show a possible embodiment of an apparatus in accordance with the invention for the chamfer machining of a toothed workpiece 5. The apparatus has a workpiece spindle 1 having a workpiece holder 2 rotatably supported about an axis of rotation C2 for holding the workpiece 5. The apparatus furthermore has a tool spindle 3 having a tool holder 4 rotatably supported on an axis of rotation B3 for holding a finger mill 6.

The workpiece spindle 1 is arranged on a machine bed 7 that is connected to a machine column or machine frame 8 at which a machining head 9 is arranged that carries the tool spindle 3. The machining head 9 and/or the tool spindle 3 arranged at the machining head 9 are travelable over a plurality of machine axes relative to the workpiece spindle 1.

The axis configuration is selected as follows in the embodiment:

The machining head is travelable via a first linear axis X in a direction perpendicular to the axis of rotation C2 of the workpiece holder 2. The finger mill can hereby be traveled to the workpiece in a plane perpendicular to the axis of rotation of the workpiece spindle.

The machining head is furthermore travelable via a second linear axis Z in a direction in parallel with the axis of rotation C2 of the workpiece holder 2. The finger mill can hereby be traveled in the axial direction relative to the workpiece 5.

In the embodiment, a first pivot axis A is furthermore provided that extends in parallel with the first linear axis X and permits a pivoting of the machining head 9.

A third linear axis Y is furthermore provided that permits a travel of the machining head in a direction perpendicular to the first linear axis X and to the second linear axis Z. Alternatively to such a third linear axis Y, a third linear axis V could also be used that is arranged between the machining head and the first pivot axis A and can therefore be pivoted via the first pivot axis A. The third linear axis Y or V permit a travel of the finger mill 6 with respect to a plane that extends through the axis of rotation C2 of the workpiece holder in parallel with the X axis and thus a lateral movement with respect to the center of the workpiece 5.

A second pivot axis A2 is furthermore provided via which the tool spindle 3 is pivotably arranged at the machining head 9. The second pivot axis A2 extends perpendicular to the first pivot axis A and preferably intersects it. The angle of attack of the finger mill 6 relative to the gearing of the workpiece can be set by the second pivot axis A2.

The second pivot axis A2 permits the angle of the finger mill 6 relative to the axis of rotation C2 of the workpiece holder and thus the chamfer angle for a machining to be set. The second pivot axis A2 additionally permits the finger mill to pivot from a first pivot position such as is shown in FIG. 15 and that serves the machining of a lower edge into a second pivot position such as is shown in FIG. 16 and that serves the machining of an upper edge. The finger mill can preferably still be pivoted into a neutral position such as is shown in FIGS. 13 and 14 and in which the finger mill was pivoted away from the workpiece.

The axis of rotation D1 of the workpiece holder 2, the first linear axis X, and the second linear axis Z are each NC axes. The third linear axis Y or V and the first pivot axis A are equally NC axes.

The axis of rotation B3 of the tool holder 4 in contrast does not have to be configured as an NC axis since it only serves the non-synchronized drive of the finger mill 6.

The second pivot axis A2 can be configured as an adjusting axis in a first embodiment. The positions of the pivot axis A2 can in this case be defined manually or via abutments, for example.

In an alternative embodiment, the second pivot axis A2 can also be configured as an NC axis. On the one hand, this permits flexibly traveling to the above-named positions for machining different edges, flexibly setting the angle of attack of the gear hob in the chamfer machining, and optionally also varying the angle of attack via the tooth space.

Meshing sensors 10 and 11 are furthermore arranged at the machining head 9. The meshing sensor 10 serves the measurement of external gearing arrangements; the meshing sensor 11 the measurement of internal gearing arrangements. A machining head will typically only have one of the two sensors. A contactless sensor, in particular an inductive sensor, is preferably used as the meshing sensor.

The meshing of a workpiece 5 with an external gearing arrangement by the meshing sensor 10 is shown in FIG. 13. The tool spindle 3 is pivoted into a neutral position via the second pivot axis A2 for this purpose. The meshing sensor 10 is traveled to the gearing and the workpiece is rotated via the axis of rotation C2. The meshing sensor detects the position of the teeth or tooth grooves on the rotational movement. The finger mill can then be positioned in the correct position relative to the tooth space by the detection of the position of the teeth or of the tooth grooves in the following chamfer machining.

FIG. 14 shows the measurement of a workpiece 5' having an internal gearing. The meshing sensor has a sensor arm 12 for this purpose that extends into the internal gearing arrangement. In the embodiment, two sensor arms 12 and 12' are provided that are oriented in opposite directions to enable a measurement of internal gearing arrangements from both above and below.

The chamfer machining of the workpiece 5 having an external gearing arrangement already shown in FIGS. 1A, 1B, and 13 by the apparatus in accordance with the invention is shown in FIGS. 15 and 16. The workpiece 5 has a plurality of gearing arrangements 13, 14, and 15. The chamfer machining of the middle teeth 14 is particularly problematic since the two outer gearing arrangements 13 and 15 form interference contours that have to be taken into account in the chamfer machining.

The finger mill 6 is therefore respectively positioned such that it extends, starting from the tool holder 4, through the tooth space to the contact point with the respective edge of the teeth to be machined. Only the tip of the finger mill 6 therefore projects beyond the respective end face of the teeth to be machined. Teeth such as the internal gearing arrangement 14 having interference edges arranged very closely to the respective front edge can thus be chamfer machined.

FIG. 15 shows the chamfer machining of a lower edge of the middle gearing arrangement of the workpiece 5. The tool spindle having the finger mill 6 was pivoted for this purpose via the second pivot axis A2 into a lower machining position. The angle of the chamfer is set via the pivot position of the tool spindle 3 is set by means of the second pivot axis A2.

Since only very little space is present next to the lower edge of the middle gearing arrangement 14, exclusively or almost exclusively the first linear axis X is used for machining the lower edge to travel the finger mill in a controlled manner along the tooth edge and a travel movement via the second linear axis Z is in contrast completely or very largely dispensed with. The total tooth edge can hereby be chamfer machined over a front region of the finger mill 6 so that the tip of the finger mill is only just visible above the corresponding lower front edge of the middle gearing arrangement 14. This procedure is, however, associated with the disadvantage that the total length of the finger mill is not used for the gear manufacturing machining so that the wear is concentrated in the front region of the finger mill.

FIG. 16 shows the chamfer machining of a upper edge of the middle gearing arrangement 14. For this purpose, the tool spindle having the finger mill 6 was pivoted via the second pivot axis A2 into an upper machining position in which the finger mill 6 lies on the upper edge. The chamfer angle can here also be set via the second pivot axis A2.

Since more space is available above the upper edge, the finger mill 6 is exclusively or predominantly traveled via the second linear axis Z along the tooth edge. This has the advantage that different axial regions of the jacket surface of the finger mill are used for the chamfer machining so that the wear can be distributed evenly over the finger mill. A travel movement via the X axis can either be completely dispensed with or both the first linear axis X and the second linear axis Z can be used to generate the travel movement.

In a possible embodiment of the present invention, primarily the first linear axis X is used for machining the dedenda and primarily the second linear axis Z is used for machining the tooth traces. It is hereby taken into account that an additional interference contour is present in the region of the dedenda due to the proximity of the shaft of the workpiece. On a machining of the tooth traces, the distance from the shaft is greater, in contrast, so that here work can primarily be carried out with the second linear axis Z.

FIGS. 17 to 20 show the chamfer machining of a workpiece having internal gearing. The workpiece 5' here also has a plurality of gearing arrangements 16 and 17. A collar 18 is provided between the upper internal gearing arrangement 16 and the lower internal gearing arrangement 17. The chamfer machining of the respective inwardly disposed edges of the upper gearing 16 and of the lower gearing 17 is particularly problematic due to the poor accessibility and the interference contours.

FIG. 17 shows the chamfer machining of the lower edge of the upper internal gearing arrangement. The machining head 9 having the tool spindle 4 was traveled by means of the first linear axis X into a position above the gearing for this purpose. The finger mill 6 therefore extends obliquely from above into the gearing and lies on the lower edge of the internal gearing arrangement 16.

On the gear manufacturing machining, the finger mill having the workpiece spindle 4 is located in the lower machining position that was traveled to via the second pivot axis A2. The second linear axis Z is used to travel the finger mill in the axial direction into the internal gearing arrangement.

Due to the tight interference contours, the travel movement of the finger mill along the contour of the edge during the chamfer machining preferably predominantly or exclusively take place via the first linear axis X.

FIG. 18 shows the chamfer machining of an upper edge of the upper gearing arrangement 16. The finger mill 6 here extends, starting from the tool holder 4, from the end face of the gearing into the gearing so that the tip of the finger mill is arranged within the gearing. Since no interference contours have to be considered here, the finger mill 6 can only or predominantly be traveled via the second linear axis Z along the contour of the tooth edge during the chamfer machining.

Figure 20:
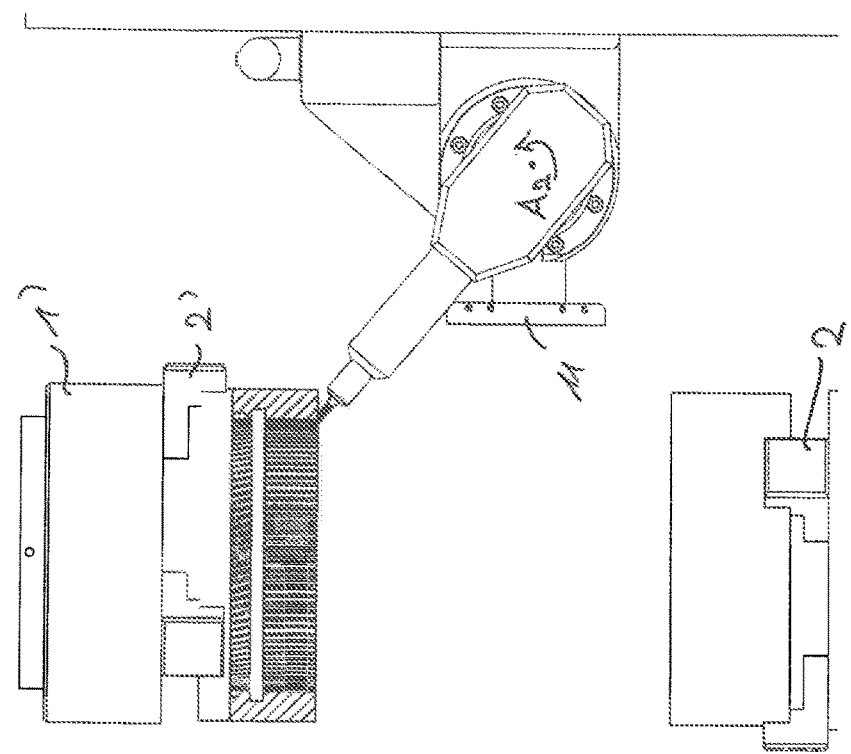

FIGS. 19 and 20 show the chamfer machining of the lower gearing 17 of the internally toothed workpiece 5'. Since at least the upper edge of the lower gearing 17 cannot be machined from the upper side of the gearing, a second workpiece spindle 1' having a corresponding second workpiece holder 2' is provided.

The two workpiece spindles are coaxially arranged and can be moved toward one another in the axial direction such that a workpiece held in the first workpiece holder 2 can be gripped by gripping jaws of the second workpiece holder 2'. The first workpiece holder 2 thereupon releases the workpiece so that it is now held in the second workpiece holder 2'. The second workpiece holder 2' is or can be arranged such that the machining head 9 having the tool spindle 3 can travel beneath the workpiece 5'.

At least one of the two workpiece holders is axially travelable in the direction of the axis of rotation D1 to transfer the workpiece 5' from the first workpiece holder 2 to the second workpiece holder 2'.

The finger mill 6 was in turn traveled via the first linear axis X over the center of the gearing in FIG. 19 for machining the upper and thus inner edge of the lower gearing 17. The finger mill here extends, starting from the tool holder 4, through the gearing to the edge to be machined. The gear manufacturing machining takes place analogously to the situation shown in FIG. 17.

The lower and thus outer tooth edge of the lower gearing 17 is chamfer machined in FIG. 20. The machining here takes place analogously to the chamfer machining in FIG. 18.

Depending on how the transfer process of the workpiece from the first to the second workpiece spindle takes place, a repeat meshing of the gearing for meshing the finger mill can be dispensed with or a repeat meshing of the workpiece held in the second workpiece holder 2' has to take place. The upper arm of the meshing sensor 11 can be used in the same way for this purpose as is shown in FIG. 14 for the lower arm, only that now the meshing sensor engages into the gearing from below.

Independently of the previously described details of the machining process, in accordance with the first aspect of the present invention, the rotational speed of the workpiece 5 about the axis of rotation C2 is varied during the chamfer machining. The rotation of the workpiece in particular takes place at a speed varying over the tooth space.

Work is preferably at least carried out in the chamfer machining of a tooth trace at a lower speed than in the chamfer machining of a dedendum and/or addendum. The cutting volume per unit of time can hereby be influenced and preferably kept as constant as possible.

Such a variation of the rotational speed of the workpiece also has advantages independently of the guidance of the finger mill via NC axes of the gear manufacturing machine along the contour of the edge and could therefore, for example, also be used in a procedure that corresponds to the Gratomat process known from the prior art, i.e. in which the finger mill lies on the tooth edge in a spring loaded manner. However, particular advantages result in the variation of the rotational speed in combination with the controlled guidance of the finger mill via the NC axes of the machine along the tooth edge since substantially higher machining speeds are hereby made possible.

In accordance with the invention, the third linear axis Y or V is furthermore in particular also used for the machining of helical gearing arrangements to position the finger mill 6 relative to the tooth space. The machining head 9 is for this purpose traveled via the Y or V axis out of the center of the gearing arrangement of the workpiece. The axis of rotation B3 of the tool spindle hereby no longer intersects the axis of rotation C2 of the workpiece spindle. The machining head is furthermore at least arranged on the use of a Y axis such that the A axis no longer intersects the axis of rotation D1 of the workpiece spindle, but runs past it at a distance. On the use of a V axis, in contrast, the axis of rotation B3 of the tool spindle 3 preferably no longer intersects the first pivot axis A.

The use of the third linear axis Y or V for positioning the finger mill 6 relative to the gearing in particular make it possible with helical gearing arrangements to achieve a symmetrical chamfer on the left and right traces with fewer travel movements during the chamfer machining. The third linear axis Y or V can be used in a first embodiment exclusively for the positioning of the finger mill in a fixed position for the chamfer machining. In a second embodiment, the position along the third linear axis can in contrast also be varied during the chamfer machining and in particular over the tooth space.

The first pivot axis A and the second pivot axis A2 can likewise be used either only for a one time positioning of the finger mill relative to the tooth edge or via the gear manufacturing machining for a controlled guidance of the finger mill along the tooth edge. Optionally, one of the two pivot axes or even both pivot axes can be dispensed with.

In accordance with the invention, a finger mill having a cylindrical or conical jacket surface or envelope surface is used as the finger mill. The cone angle preferably amount to less than 20°, in particular less than 10°. A cone is of advantage to be able to machine a tooth space with the smaller diameter of the finger mill, but to increase the stability of the finger mill by the larger diameter in the remaining regions.

The region of the dedendum is therefore preferably machined with a front region of the finger mill on the use of a conical finger mill, but the tooth traces in contrast with a region arranged further to the rear at the finger mill.

All of the described procedures are preferably provided by one or more machining functions of the control of the apparatus and are used by it in an automated fashion for the chamfer machining of one workpiece and preferably for the machining of a plurality of identical workpieces.

The invention claimed is:

1. An apparatus for a chamfer machining of a toothed workpiece comprising:
a workpiece spindle having a workpiece holder rotatably supported about an axis of rotation for holding the toothed workpiece, the axis of rotation of the workpiece spindle defining opposing upward and downward directions with the upward direction going from the workpiece spindle toward the toothed workpiece;
a tool spindle having a tool holder rotatably supported about an axis of rotation holding a finger mill; and
a control comprising a microprocessor, the control configured to perform the following:
travel the tool spindle along at least one linear axis of the apparatus relative to the workpiece holder to chamfer an edge of the toothed workpiece by bringing the finger mill into contact with the edge, the edge being one of an upper edge and a lower edge of the toothed workpiece, with the tool holder arranged at a radial position that is outside of a maximum outer radius of the edge of the gearing and axially below the edge if the edge is the upper edge and axially above the edge if the edge is the lower edge, and with an orientation of the axis of rotation of the tool holder extending at an angle with respect to the axis of rotation of the workpiece holder and at an angle to a plane that extends perpendicular to the axis of rotation of the workpiece holder such that the finger mill extends, starting from the tool holder, from a radially outer position axially below the edge if the edge is the upper edge and axially above the edge if the edge is the lower edge to the edge of the toothed workpiece and from there to a radially inner position in a space that is above the toothed workpiece if the edge is the upper edge and axially below the toothed workpiece if the edge is the lower edge,
rotate the toothed workpiece held in the workpiece holder by controlling the workpiece spindle for the chamfer machining of the toothed workpiece while the finger mill engages at the edge of the toothed workpiece with a slanted orientation of the axis of the tool spindle with respect to the axis of the workpiece spindle,
vary the rotational speed of the toothed workpiece during the chamfer machining of an individual tooth space, and machining a left tooth flank of the tooth space at a different rotational speed and/or rotational acceleration than a right tooth flank.

2. The apparatus in accordance with claim 1, wherein the variation of the rotational speed is identical for every tooth space.

3. The apparatus in accordance with claim 1, wherein the control is configured to change a direction of rotation of the toothed workpiece.

4. The apparatus in accordance with claim 1, wherein the control for the chamfer machining of the toothed workpiece held in the workpiece holder moves the tool spindle relative to the workpiece spindle by controlling movement of the tool spindle along the at least one linear axis such that the finger mill is guided along the edge of the toothed workpiece while the toothed workpiece is rotated about its axis of rotation.

5. The apparatus in accordance with claim 1, wherein the at least one linear axis comprises:
a first linear axis X via which the tool spindle is travelable in a direction perpendicular to the axis of rotation of the workpiece holder, and/or
a second linear axis Z via which the tool spindle is travelable in parallel with the axis of rotation of the workpiece holder; and
wherein movement of the tool spindle along the first linear axis X and/or the second linear axis Z such that the finger mill is guided along the edge of the toothed workpiece while the toothed workpiece is rotated about its axis of rotation.

6. The apparatus in accordance with claim 5, wherein the control controls movement of the tool spindle along the first linear axis X and/or the second linear axis Z such that different axial regions of the finger mill come into engagement with the edge of the toothed workpiece; and/or wherein the finger mill is guided along the edge at least over a part of the tooth space only via the second linear axis Z or only via the first linear axis X.

7. The apparatus in accordance with claim 1, wherein the finger mill has a cylindrical body or a conical body at a cone angle of less than 20° as a cutting surface.

8. The apparatus in accordance with claim 1, wherein the tool spindle is not pivoted on traveling through a tooth space; or wherein the tool spindle is pivotable about a first pivot axis, wherein the control is configured to pivot the tool spindle via the first pivot axis on traveling through the tooth space to reduce variations of an angle of a chamfer created by the finger mill on the edge of the toothed workpiece.

9. The apparatus in accordance with claim 5,
wherein the tool spindle is further travelable via a third linear axis Y/V that is perpendicular to the first linear axis X;
wherein the tool spindle is pivotable via a pivot axis A2 extending in parallel to the third linear axis Y/V that is perpendicular to the first linear axis X.

10. The apparatus in accordance with claim 7, wherein the cone angle is less than 10°.

11. The apparatus in accordance with claim 1, wherein the control is configured to vary a chamfer width and/or a chamfer depth and/or a chamfer angle of the chamfer shape over the tooth space.

12. The apparatus in accordance with claim 5, wherein the finger mill is guided along a part of the tooth space by a superposition of a movement of the first linear axis X and a movement of the second linear axis Z.

13. The apparatus in accordance with claim 9, wherein the tool spindle is arranged for the chamfer machining via the third linear axis Y/V such that the axis of rotation of the tool holder does not intersect the axis of rotation of the workpiece holder and extends skewed thereto.

14. The apparatus in accordance with claim 1, wherein the control is further configured to machine each of a left tooth flank, right tooth flank, and at least one of the addendum or a dedendum at a different average rotational speed.

15. The apparatus in accordance with claim 1, the variation of the rotational speed reduces a variation in the relative speed between the edge and the finger mill over the tooth space to less than or equal to 30% of a maximum value.

16. The apparatus in accordance with claim 14, wherein the control is further configured to position the tool spindle for chamfer machining along the third linear axis Y/V such that a contact point between the finger mill and the edge is offset with respect to a second plane in which the axis of rotation of the workpiece holder is extending and which extends parallel to the first linear axis and an axis of rotation of the tool spindle is extending in parallel with but offset to the second plane.

* * * * *